(12) United States Patent
Kowald et al.

(10) Patent No.: US 10,997,704 B2
(45) Date of Patent: May 4, 2021

(54) METHOD OF SELECTING AN ORDERED IMAGE SUBSET FOR STRUCTURE ASSESSMENT

(71) Applicant: CANON KABUSHIKI KAISHA, Tokyo (JP)

(72) Inventors: Julie Rae Kowald, Dundas Valley (AU); Nicholas Grant Fulton, Turramurra (AU)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 16/461,149

(22) PCT Filed: Nov. 28, 2017

(86) PCT No.: PCT/AU2017/000252
§ 371 (c)(1),
(2) Date: May 15, 2019

(87) PCT Pub. No.: WO2018/112497
PCT Pub. Date: Jun. 28, 2018

(65) Prior Publication Data
US 2019/0279353 A1  Sep. 12, 2019

(30) Foreign Application Priority Data
Dec. 22, 2016 (AU) ................................ 2016277672

(51) Int. Cl.
*G06T 7/00* (2017.01)
*G06K 9/00* (2006.01)

(52) U.S. Cl.
CPC ........ *G06T 7/0002* (2013.01); *G06K 9/00637* (2013.01); *G06K 9/00651* (2013.01);
(Continued)

(58) Field of Classification Search
CPC ......... G06T 7/0002; G06T 2207/10016; G06T 2207/30108; G06T 2207/30188; G06K 9/00637; G06K 9/00651; G06K 9/00657
See application file for complete search history.

(56) References Cited

U.S. PATENT DOCUMENTS 5,990,941 A  11/1999 Jackson et al.
6,178,253 B1  1/2001 Hendrickson et al.
(Continued)

OTHER PUBLICATIONS

Varadharajan Srivatsan, et al., Vision for road inspection, IEEE Winter Conference on Applications of Computer Vision, IEEE, Mar. 24, 2014, pp. 115-122, XP032609955.
(Continued)

*Primary Examiner* — Yon J Couso
(74) *Attorney, Agent, or Firm* — Canon U.S.A., Inc. IP Division

(57) ABSTRACT

A method for displaying a sequence of review images related to a structure, said method comprising: receiving (501) a review target (313) for the structure and an environmental factor (305) affecting at least one property of the structure; selecting (503), from a plurality of captured images related to the structure, a plurality (321) of review images of at least a part of the structure based on the review target, the environmental factor and position information associated with the review images with respect to the structure; and causing a display device to display the selected review images ordered according to the review target to form the sequence of review images.

12 Claims, 20 Drawing Sheets

(52) U.S. Cl.
CPC ............... *G06K 9/00657* (2013.01); *G06T 2207/10016* (2013.01); *G06T 2207/30108* (2013.01); *G06T 2207/30188* (2013.01)

(56) References Cited

U.S. PATENT DOCUMENTS

| | | |
|---|---|---|
| 6,466,321 B1 | 10/2002 | Satake et al. |
| 8,135,178 B2 | 3/2012 | Hendrickson et al. |
| 9,098,503 B1 | 8/2015 | Johnson et al. |
| 9,117,140 B2 | 8/2015 | Purcell et al. |
| 2005/0273720 A1 | 12/2005 | Cochran et al. |
| 2010/0332210 A1* | 12/2010 | Birdwell ............ G06F 16/2228 703/22 |
| 2014/0168412 A1 | 6/2014 | Shulman et al. |
| 2014/0378810 A1* | 12/2014 | Davis .................... G06F 19/00 600/407 |
| 2016/0302351 A1* | 10/2016 | Schildroth ............ B64C 39/024 |
| 2017/0076438 A1* | 3/2017 | Kottenstette ........... G06K 9/627 |
| 2017/0223947 A1* | 8/2017 | Gall .................. G01N 21/4738 |

OTHER PUBLICATIONS

Smith, M.D., et al., Geospatial Analysis—5.1.2 Spatial Sampling, 5th Edition, 2015, URL: http://www.spatialanalysisonline.com/HTML/index.html?spatial_sampling2.htm, Section 5.1.2—Spatial Sampling, 2nd paragraph, retrieved from Internet May 2019.

Olmec Vision Inspection Website, URL: http://www.olmec-uk.com/wp/products/quality-station-in-line-vision-inspection/, retreived from Internet Jan. 2019.

\* cited by examiner

METHOD OF SELECTING AN ORDERED IMAGE SUBSET FOR STRUCTURE ASSESSMENT

CROSS-REFERENCE TO RELATED APPLICATIONS

This application is the National Phase application of PCT Application No. PCT/AU2017/000252, filed on Nov. 28, 2017 and titled "METHOD OF SELECTING AN ORDERED IMAGE SUBSET FOR STRUCTURE ASSESSMENT". This application claims the benefit under 35 U.S.C. § 119(a)-(d) of Australian Patent Application No. 2016277672, filed on Dec. 22, 2016 and titled "METHOD OF SELECTING AN ORDERED IMAGE SUBSET FOR STRUCTURE ASSESSMENT". The above cited patent applications are hereby incorporated by reference herein in their entireties.

TECHNICAL FIELD

The present invention relates to image management and processing and in particular to a mechanism for selecting images of a structure that enable an efficient assessment of that structure to be performed.

BACKGROUND

Assessment of structures is an important undertaking in many commercial and governmental areas. In this specification, the term "structure" includes within it's scope things like coal mines, bridges, agricultural products growing in fields and so on. Conventionally assessment of a structure can be undertaken in a number of ways. If the structure can be viewed directly by a user, the user may move around the structure and look at it in order to make the assessment. The user may perform an assessment of a number of factors while viewing the structure and may carry a recording device such as an IPad®, a notepad or camera to capture information about the structure. Alternately, or in addition, the information about the structure may be captured using an information capture device such as a thermal camera or a spectroscope which is carried and used by the user for non-visual assessment.

In agriculture, assessment of a current state of a crop is a key task for a farmer. In trellised crops, such as grapes, the structure upon which this assessment is performed includes the infrastructure of the vineyard, such as the posts and irrigation lines, and the vines themselves, which are considered at their current growth stage. Assessment typically focuses on different review targets depending on the season.

The term "review target" can be understood in reference to the structure being considered. Accordingly, when considering a structure being a vineyard, a review target may be light brown apple moth or a fungus. When considering a structure being a bridge, a review target may be rust. When considering a structure being a road, a review target may be snow or ice damage.

Considering a vineyard, in spring, when the soil temperature rises enough, shoots of the vines will emerge during what is referred to as the budburst period. Assessment at this stage typically focuses on levels of pest activity, e.g. mites, and fungal growth, these being the relevant review targets in this instance. The result of the assessment may lead to spraying of prophylactic agents onto the vines. The assessment is commonly carried out on foot by a viticulturist who selects a row to walk down, and who visually looks at the vines in order to determine their status. The viticulturist may choose to visit a couple of areas of a vineyard to perform this on-foot scouting activity, and will typically carry a notepad and a pen for recording observations. Some viticulturists carry cameras or may use a smartphone device to capture images to support their observations. As the vines grow the viticulturist may return to the vineyard and carry out further scouting.

An important assessment carried out in vineyards is that of yield estimation. This activity is performed a number of times during the year in which the vines typically reach growth stages indicative of their future productivity. Conventionally, the best-of-class approach involves sampling of vines by visiting specific locations in the vineyard and counting indicating factors, such as inflorescences or bunches.

In some cases the structure to be considered may be difficult for a user to travel around and information about the structure for assessment may be captured by other means. Such means can include (i) remote capture of visual information about the structure using a camera with a zoom or macro lens, (ii) capture of information from sensors attached to or embedded in the structure in question, (iii) capture of information using a remote controlled device such as a quadcopter or balloon, or (iv) capture of visual information using a robot or other autonomous vehicle. Such methods are used to capture visual information about structures that cannot conveniently be viewed directly, and from this information the desired assessments are made.

In transport systems the assessment of roads, rail, sea ports and airports is important in order to keep an economy efficiently functioning. Road inspection is carried out in a number of ways and different agencies have responsibility for road inspection depending on the location and type of road. Vehicles are typically used for road inspection, such vehicles being equipped with front, rear and side facing cameras that capture images of the road as the vehicle is driven down the roads in question. These images may be stored for later processing or may be processed on-board to assess the current road status. The status (ie review targets) being monitored typically includes cracks, potholes and road surface wear/smoothness.

One problem with the conventional approach which performs assessment of a structure using a human travelling around the structure is the difficulty of achieving sufficient coverage. For a structure of sufficient size and/or complexity it may take a long time to perform the assessment at a sufficient level of accuracy, and if the time required is too large the cost may exceed the value of the assessment.

Another problem with the conventional approach which uses automated capture of information for subsequent assessment by a human is that the quantity of information to be viewed by the human can be very large, and the assessment consequently will take a long time. If this time is too long the cost may exceed the value of the assessment.

SUMMARY

It is an object of the present invention to substantially overcome, or at least ameliorate, one or more disadvantages of existing arrangements.

Disclosed are image subset selection arrangements which seek to address the above problems by selecting, depending upon environmental factors, a subset of images of the structure for review by a user in order to determine the value of a review target.

According to a first aspect of the present disclosure, there is provided a method for displaying a sequence of review images related to a structure, said method comprising:

receiving a review target for the structure and an environmental factor affecting at least one property of the structure;

selecting, from a plurality of captured images related to the structure, a plurality of review images of at least a part of the structure based on the review target, the environmental factor and position information associated with the review images with respect to the structure; and causing a display device to display the selected review images ordered according to the review target to form the sequence of review images According to a second aspect of the present disclosure, there is provided a method for generating a sequence of review images for display, said images being related to a structure, said method comprising:

receiving a review target for the structure and a predetermined sampling pattern corresponding to at least one environmental factor associated with the structure;

selecting a first review image of at least a part of the structure from a plurality of images related to the structure, said first review image having associated position information with respect to the structure and being selected based on the review target;

determining a set of review images from the plurality of images related to the structure based on the position information of the selected first review image and the predetermined sampling pattern; and ordering the selected first review image together with the determined set of review images according to the review target to form the sequence of review images.

Optionally, in the method according to the second aspect of the disclosure, the step of receiving the predetermined sampling pattern comprises the steps of:

selecting the predetermined sampling pattern from a set of predetermined sampling patterns depending upon said at least one environmental factor associated with the structure.

Optionally, the method according to the second aspect of the disclosure comprises the further steps of:

determining if the environmental factor has geospatial variation over the structure; and if the environmental factor has geospatial variation over the structure, generating a geospatial variation dependent sampling pattern from the predetermined sampling pattern.

Optionally, the method according to the second aspect of the disclosure comprises the further steps of:

determining if there is a further environmental factor, from a set of environmental factors, affecting the structure; and if there is a further environmental factor, selecting a further predetermined sampling pattern from the set of predetermined sampling patterns depending upon said further environmental factor associated with the structure.

Optionally, the method according to the second aspect of the disclosure comprises the further steps of:

combining the predetermined sampling pattern and one of the further predetermined sampling pattern and the geospatial variation dependent sampling pattern to form a combined sampling pattern.

Optionally, the combining step comprises:

convolving the predetermined sampling pattern and one of the further predetermined sampling pattern and the geospatial variation dependent sampling pattern to form the combined sampling pattern.

Optionally, the method according to the second aspect of the disclosure comprises the further steps of:

repeating the steps of:

(a) determining if there is a further environmental factor affecting the structure;

(b) selecting if there is a further environmental factor a further predetermined sampling pattern depending upon said further environmental factor;

(c) determining if the environmental factor has geospatial variation over the structure;

(d) if the environmental factor has geospatial variation generating a further geospatial variation dependent sampling pattern from the further predetermined sampling pattern; and (e) combining the further predetermined sampling pattern and one of the further predetermined sampling pattern and the further geospatial variation dependent sampling pattern to form a further combined sampling pattern.

Optionally, in the method according to the second aspect of the disclosure:

the structure is a vineyard;

the review target is downy mildew;

the environmental factors relevant to the sampling pattern comprise humidity and topology of the vineyard;

the sampling pattern is a partially random grid of sampling points with higher density in lower areas of the structure and those areas of the structure with recent rainfall; the method comprising, after the determining step and prior to the ordering step, the further steps of:

detecting location of leaves in the selected images;

determining if (i) oil-spots are present or (ii) downy appearance is present;

if either of these conditions are satisfied applying a spiral sampling pattern based on a location of the leaves in the selected images to select additional images;

adding the additional images to the set of review images; and when all the sampling points have been processed, ordering the set of review images to form the ordered set of review images.

Optionally, in the method according to the second aspect of the disclosure:

the structure is a vineyard;

the review target is downy mildew;

the environmental factors relevant to the sampling pattern comprise topology and micro-climate of the vineyard;

selecting a random gridded sampling pattern dependent upon topology environmental factor; the method comprising, after the determining step and prior to the ordering step, the further steps of:

determining if the topology environmental factor exhibits spatial variation;

if the topology environmental factor exhibits spatial variation generating a variation dependent sampling pattern from the sampling pattern;

selecting a spiral sampling pattern depending upon micro-climate;

combining the random gridded sampling pattern and the spiral sampling pattern.

According to another aspect of the present disclosure, there is provided an apparatus for generating a sequence of review images, for display, related to a structure, said apparatus comprising:

a processor; and a memory storing a computer executable software program for directing the processor to perform a method comprising the steps of:

receiving a review target for the structure and a predetermined sampling pattern corresponding to at least one environmental factor associated with the structure;

selecting a first review image of at least a part of the structure from a plurality of images related to the structure, said first review image having associated position information with respect to the structure and being selected based on the review target;

determining a set of review images from the plurality of images related to the structure based on the position information of the selected first review image and the predetermined sampling pattern; and ordering the selected first review image together with the determined set of review images according to the review target to form the sequence of review images.

According to another aspect of the present disclosure, there is provided a tangible non-transitory computer readable medium storing a computer executable software program for directing a processor to perform a method for generating a sequence of review images, for display, related to a structure, said program comprising:

computer executable code for receiving a review target for the structure and a predetermined sampling pattern corresponding to at least one environmental factor associated with the structure;

computer executable code for selecting a first review image of at least a part of the structure from a plurality of images related to the structure, said first review image having associated position information with respect to the structure and being selected based on the review target;

computer executable code for determining a set of review images from the plurality of images related to the structure based on the position information of the selected first review image and the predetermined sampling pattern; and computer executable code for ordering the selected first review image together with the determined set of review images according to the review target to form the sequence of review images.

According to another aspect of the present disclosure, there is provided a sequence of review images related to a structure, the images produced by a method comprising the steps of:

receiving a review target for the structure and a predetermined sampling pattern corresponding to at least one environmental factor (305) associated with the structure;

selecting a first review image of at least a part of the structure from a plurality of images related to the structure, said first review image having associated position information with respect to the structure and being selected based on the review target;

determining a set of review images from the plurality of images related to the structure based on the position information of the selected first review image and the predetermined sampling pattern; and ordering the selected first review image together with the determined set of review images according to the review target to form the sequence of review images.

According to one aspect of the present invention, there is provided a method for displaying a sequence of review images related to a structure, said method comprising:

receiving a review target for the structure and an environmental factor affecting at least one property of the structure;

selecting, from a plurality of captured images related to the structure, a plurality of review images of at least a part of the structure based on the review target, the environmental factor and position information associated with the review images with respect to the structure; and causing a display device to display the selected review images ordered according to the review target to form the sequence of review images.

According to one aspect of the present invention, there is provided an apparatus for displaying a sequence of review images related to a structure, the apparatus comprising:

a processor; and a memory device storing a computer executable program for directing the processor to perform a method for displaying a sequence of review images related to a structure, said method comprising:

receiving a review target for the structure and an environmental factor affecting at least one property of the structure;

selecting, from a plurality of captured images related to the structure, a plurality of review images of at least a part of the structure based on the review target, the environmental factor and position information associated with the review images with respect to the structure; and causing a display device to display the selected review images ordered according to the review target to form the sequence of review images.

Other aspects are also disclosed.

BRIEF DESCRIPTION OF THE DRAWINGS

One or more embodiments of the invention will now be described with reference to the following drawings, in which.

DETAILED DESCRIPTION INCLUDING BEST MODE

Context

Figure 1A:
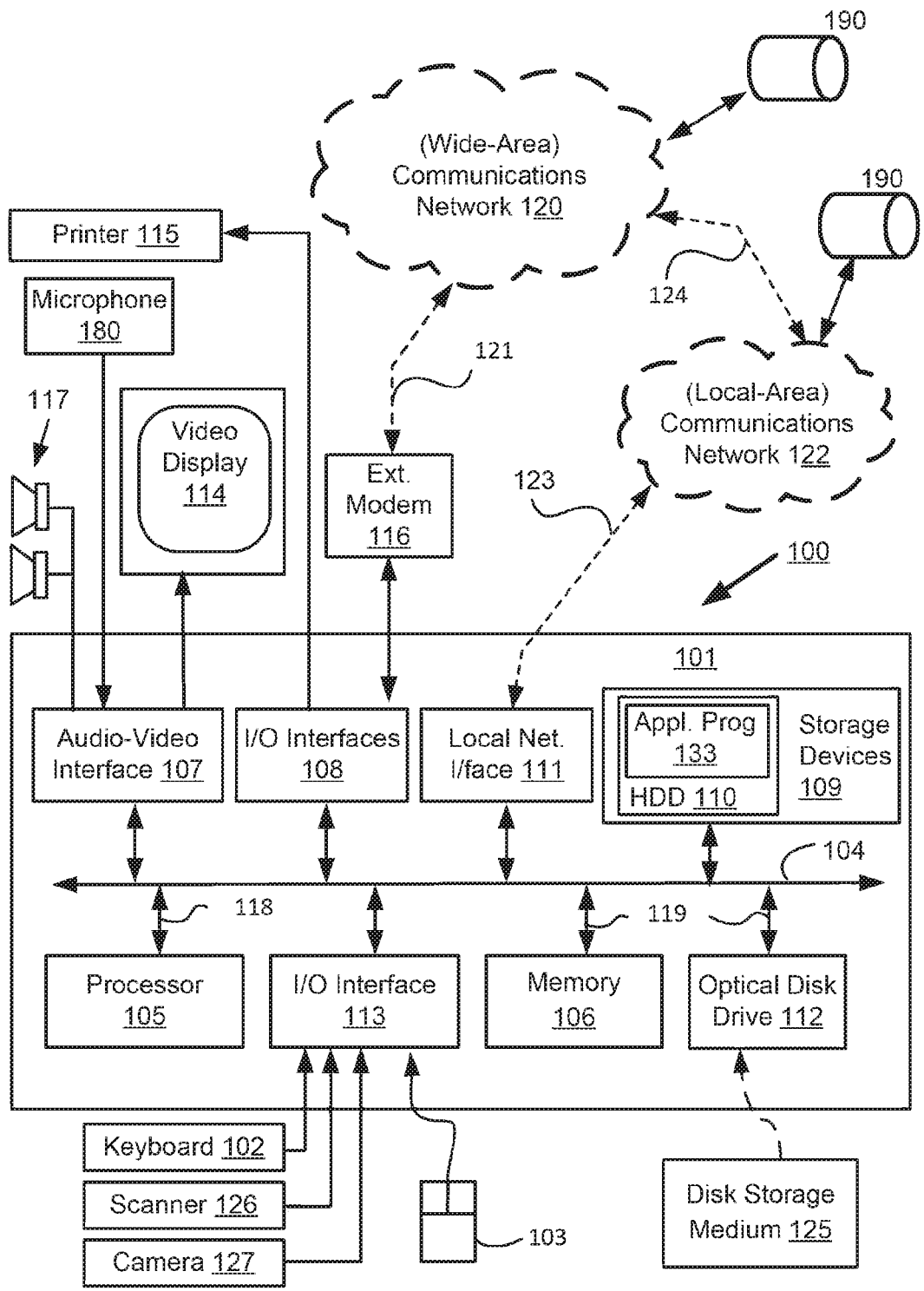
FIGS. 1A and 1B form a schematic block diagram of a general purpose computer system upon which image subset selection arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which may form public knowledge through their publication. Such discussions should not be interpreted as a representation by the present inventor(s) or the patent applicant that such documents or devices in any way form part of the common general knowledge in the art.

Figure 1B:
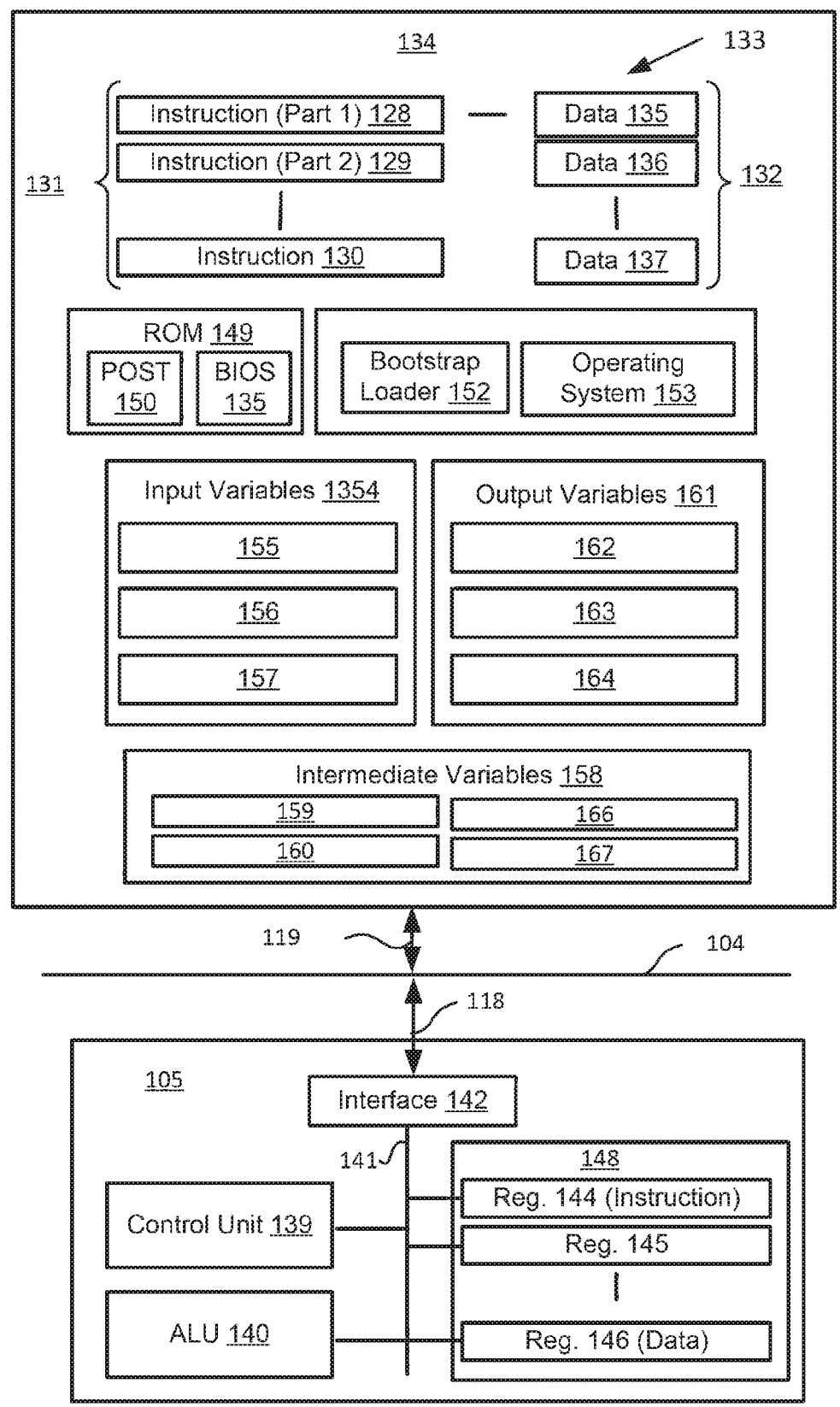

FIGS. 1A and 1B depict a general-purpose computer system 100, upon which the various image subset selection arrangements described can be practiced.

As seen in FIG. 1A, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or like computer systems.

The image subset selection method may be implemented using the computer system 100 wherein the processes of FIGS. 3-8, to be described, may be implemented as one or more software application programs 133 executable within the computer system 100. In particular, the steps of the image subset selection method are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the . . . image subset selection methods and a second part and the corresponding code modules manage a user interface between the first part and the user.

The software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous image subset selection apparatus.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects an image subset selection apparatus.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed image subset selection arrangements use input variables 154, which are stored in the memory 134 in corresponding memory locations 155, 156, 157. The image subset selection arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 3-8 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

Although the method of image subset selection has been described in regard to FIGS. 1A and 1B with respect to a general purpose processor, the aforementioned methods can also be performed upon a special purpose processor such as an IPad®, or by a hybrid platform comprising a mix of hardware elements such as gate arrays, graphical processors and the like and software elements.

Figure 2:
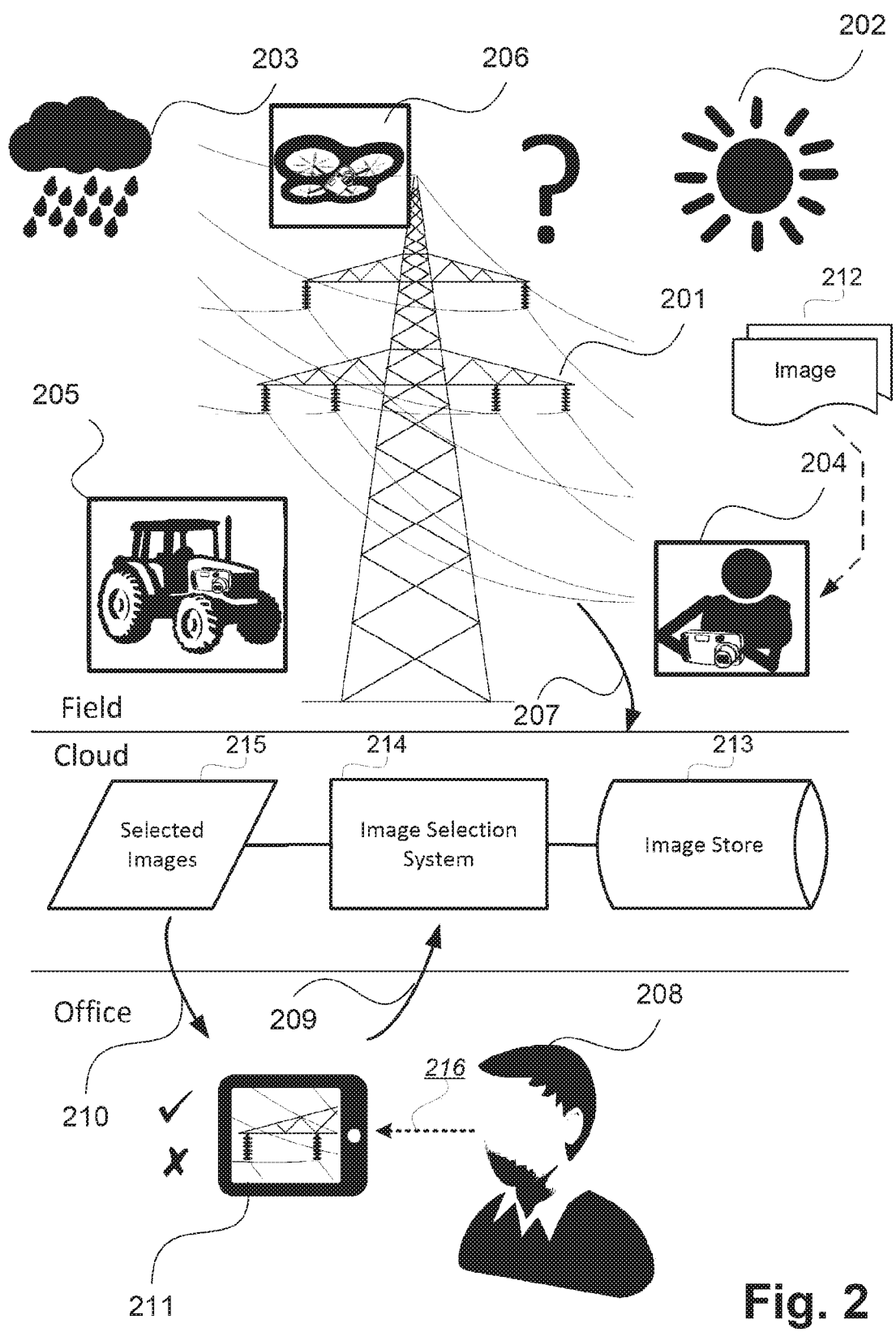
FIG. 2 illustrates a system of visual inspection of a structure using image capture and review of some images by a user.

FIG. 2 illustrates an overall system for image subset selection. A structure 201 is subject to environmental conditions, illustrated here as sun 202 and rain 203. Images 212 of the structure are captured by one or more capture platforms such as a hand-held camera 204, or other means such as vehicle mounted camera 205 or UAV camera 206. Once captured, the images 212 are stored in an image store 213 of a computer system 207, possibly cloud hosted. When a user 208 wishes to make an assessment of a review target of the structure 201, for example the current zinc consumption level, he/she requests 209 relevant images of the structure and consequently an image selection system 214 in the computer system 207 selects a set 215 of selected images for him/her and provides 210 the set 215 of selected images to the user in order to enable the user to make the assessment on their tablet device 211.

The images 212 captured of the structure 201 include, in this example, north and south facing aspect of the structure. In this example such images have been captured over the last five years since the last 'hands-on' inspection. The image selection system 214 selects the set 215 of selected images from the captured images 212 from the different compass aspects in order to capture effects on the structure 201 due to variation in weathering and includes images from the base and the top of the structure. The set 215 of selected images are presented 210 to the user 208 in an ordered manner such that where possible, in some examples, pairs of images of the same or equivalent visual fields, captured at different times, are positioned contiguously in the set 215 of selected images, in order to show change in the review target over time. From these images the user is able to make their assessment based on the visible corrosion by-products.

Figure 3:
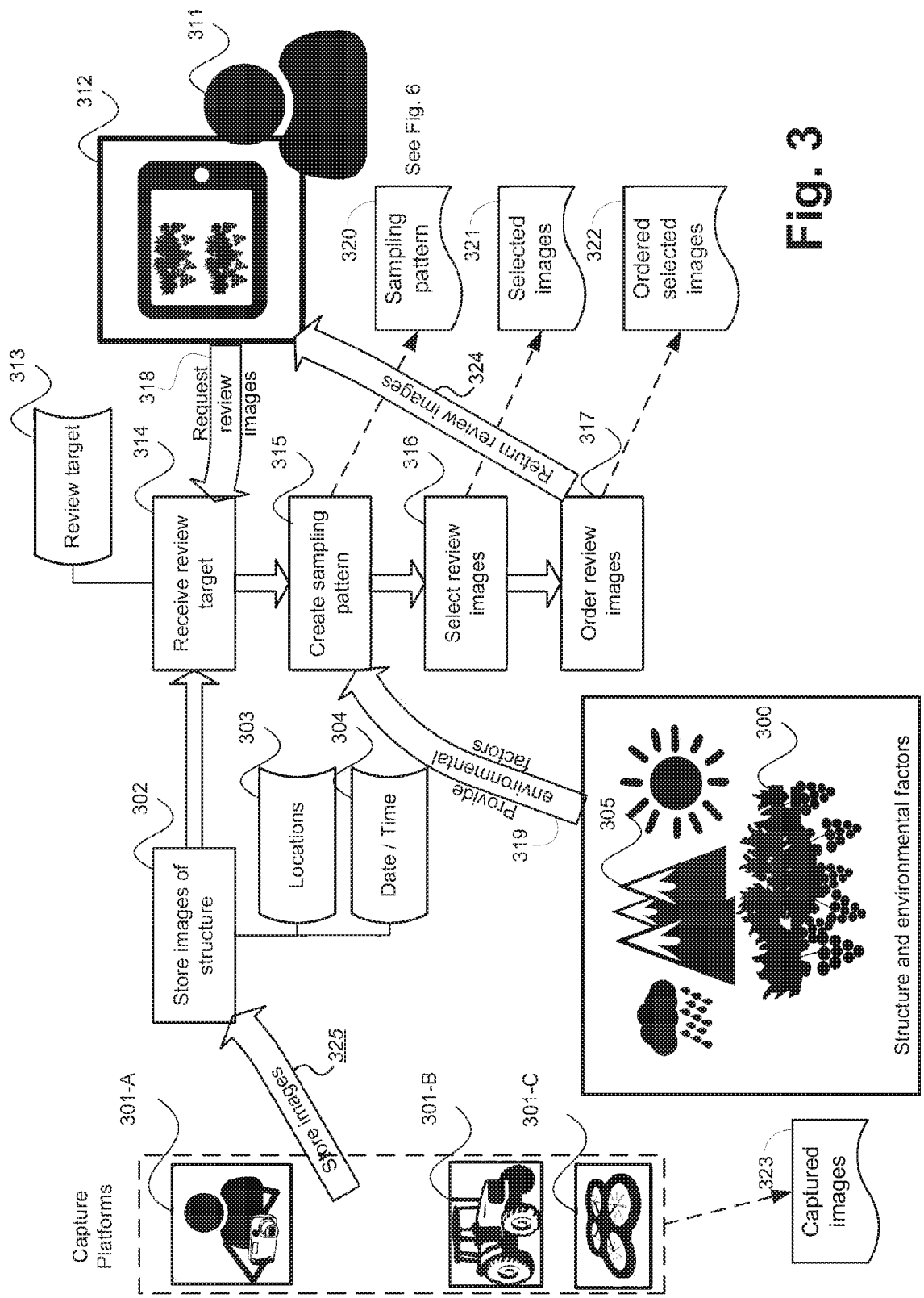
FIG. 3 shows a schematic block diagram of a software architecture for use in one of the described arrangements.

FIG. 3 illustrates an example of end-to-end flow of images from capture (which results, for e.g., in the captured images 212 in FIG. 2) to user review 216 of the set 215 of selected images. Captured images 323 of a structure 300 in question, in this case a vineyard, are captured using one or more capture platforms 301-A, 301-B, 301-C. The captured images 323 are stored 325 in a step 302 in persistent storage (eg 109 in FIG. 1A) and are processed, by a processor 105 directed by a software program 133, to extract metadata such as locations 303 and date/time of capture 304. Other metadata which may be extracted might include image features relevant to the structure in question, such as Normalized Difference Vegetation Index (NDVI) vegetation index data for the vineyard.

Figure 6:
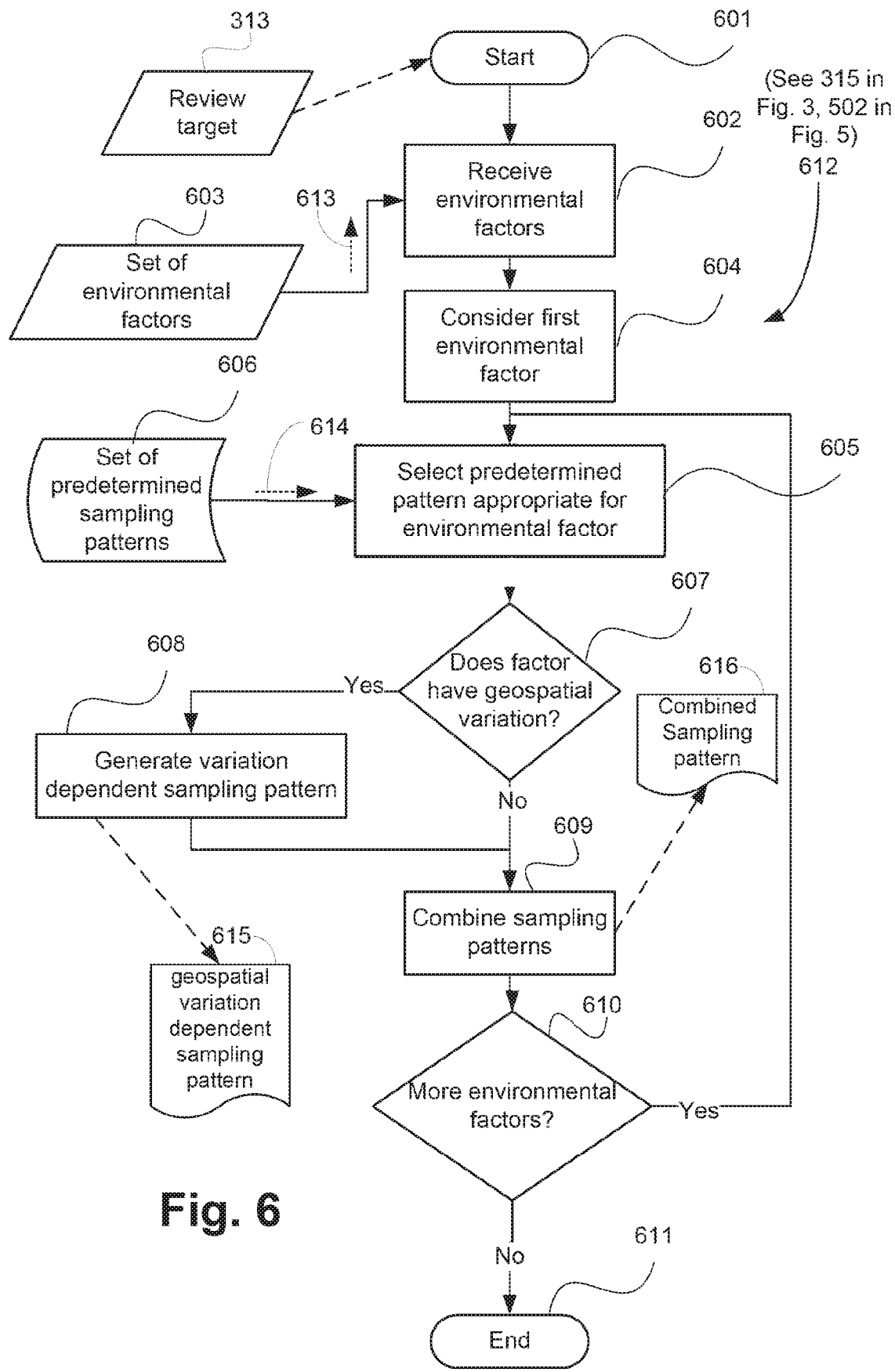
FIG. 6 is a schematic flow diagram illustrating an example of a method wherein a plurality of environmental factors are used to combine predetermined sampling patterns to generate a sampling pattern.

A user 311 using a computing device 312 requests, as depicted by an arrow 318, a set of selected images to review in a step 314 in relation to a review target 313 which has previously been specified by the user. After receiving from the user 311, as depicted by an arrow 319, environmental factors 305 relevant to the structure 300 in question, a sampling pattern 320, described hereinafter in more detail with reference to FIG. 6, is generated by the processor 105 directed by the software program 133 in a step 315. This sampling pattern 320 is used to select in a step 316, performed by the processor 105 directed by the software program 133, a set 321 of selected images from the stored captured images 323 and the selected images 321 are ordered in a step 317, performed by the processor 105 directed by the software program 133, to form a set 322 of ordered selected images, also referred to as a sequence of ordered selected review images, for presentation to the user, as depicted by an arrow 324.

The following table presents some example structures in the first column and likely review targets for these structures in the second column. In the third column some environmental factors that may influence the structure are listed.

TABLE 1

| Structure | Review target(s) | Environmental factor(s) |
| --- | --- | --- |
| Trellised crop (e.g. vineyard, apple orchard) | Growth (EL) stage, yield estimation, Mildew infection level | Soil type as depicted by a Vineyard soil-type map, topology, recent weather |
| Broad-acre cereal crop (e.g. wheat) | Growth stage, ergot infection rate. | Drainage as depicted by a Field drainage map |
| Mine (e.g. iron ore, underground coal) | Road condition, ore extraction rate, roof-bolt stress condition | Geological rock structure as identified by geological surveys, rainfall |
| Road (motorway) | Concrete stress/cracking, tarmac compression (due to heavy traffic warm weather, vegetation. | Rainfall Topology Normal traffic load |

Overview of the Disclosed Arrangements

Disclosed are a method and apparatus for selecting the set 321 of images of the structure 300 for review by the user 311 in order to determine a value for the review target 313 of the structure. The set 321 of images are selected from the collection 323 of images of the structure 300 that have been captured over time and captured at a number of locations.

The structure 300 may be subject to environmental impacts caused by a number of environmental factors that may vary over time and over the structure. These environmental factors may vary across the structure or be common to the whole structure. These environmental factors may cause variation in the target property of the structure either directly or indirectly.

An example of environmental impacts will now be described in relation to a vineyard block containing a single variety of Shiraz vines. The vineyard block slopes downwards but may suffer waterlogging in wet years when rainfall is above average. After a wet spring the vines start to develop, and will require spraying when budburst is about 50%. The vineyard block is three (3) hectares in size with vines located in rows separated by three (3) metres. The vineyard block has ten (10) km of vines. Images are captured from a tractor while the tractor is cutting the grass and weed growing between the vines. The images from the tractor are captured automatically at ten (10) second intervals from both sides of the tractor. In order to estimate a current growth stage of the vines and to estimate a best time for spraying, a viticulturist may review around forty (40) images of the vines to estimate the current growth stage.

Continuing the present example, spring rainfall will be equal across the block but waterlogging may occur in around 10% of the block. The waterlogging may cause the vines growing in the waterlogged part of the vineyard block to be delayed in their development as the ground stays cooler. Images selected by the present image subset selection arrangement for review are selected with a higher density in the waterlogged part of the vineyard block to allow the viticulturist to assesss any delay in growth of the vine; the higher density may be double that of other areas. The present image subset selection arrangement selects forty four (44) images for review by the viticulturist who tags the images with a current growth stage value. If the waterlogged part of the vineyard block shows no statistically significant difference to other areas of the vineyard block the viticulturist may recommend a copper and sulphur spray be carried out in the next few days. The disclosed arrangements consider the environmental factors and select the images 321 that ensure, with a significant likelihood, that the impact of these environmental factors does not lead to a misunderstanding of the target property of the structure in question. The disclosed arrangements order, in a step such as 317 which is performed by the processor 105 as directed by the software program 133, the selected images 321 to form the set 322 of ordered selected images, to ensure with significant likelihood that the user 311 is able to make the desired assessment in an efficient and accurate manner.

Figure 4:
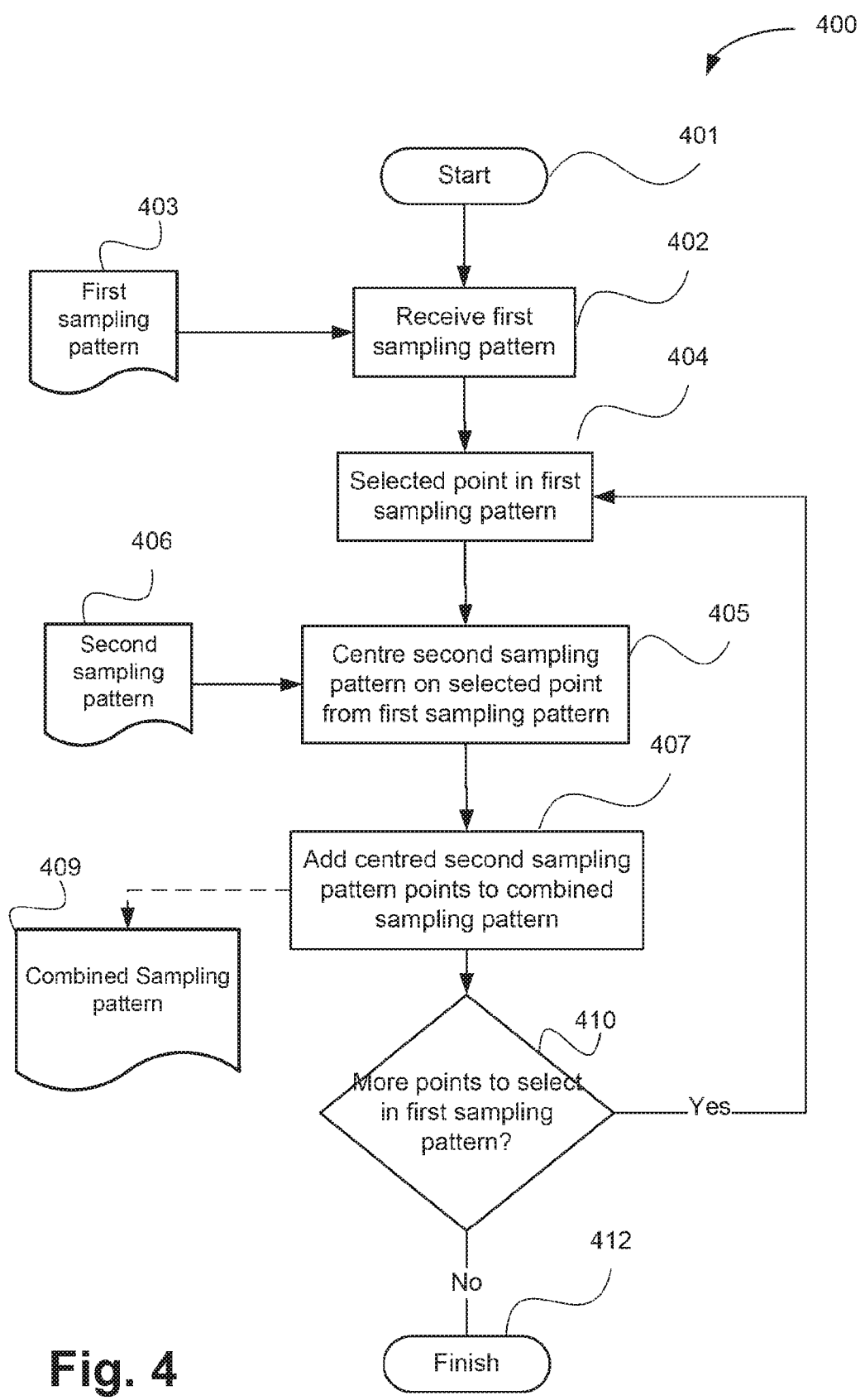
FIG. 4 shows a schematic flow diagram illustrating one example of a method of convolving two sampling patterns.

A method 400 of convolving two sampling patterns, as used in the image subset selection arrangements described below, will now be described in relation to FIG. 4. The method 400, performed by the processor 105 as directed by the software program 133, starts with a step 401. A first sampling pattern 403 is received at step 402. A first point is selected from the first sampling pattern at a selection step 404. The selected point of the first sampling pattern is set as a centre of a second sampling pattern 406 at a centering step 405. Each of the points of the second sampling pattern 406, centered on the selected point of the first sampling pattern, is added to a combined sampling pattern 409 at combination step 407.

If there are more points in the first sampling pattern to consider, as determined at decision step 410, marked by YES, the method 400 returns to selection step 404 where a next point is selected from the first sampling pattern. The centering step 405 and the combination step 407 are then repeated to produce more combined sampling patterns. The method 400 continues to loop, generating further combined sampling patterns until all points in the first sampling pattern 403 have been selected. If there are no more points to select in the first sampling pattern 403, marked by NO, the method 400 finishes 412.

Figure 5:
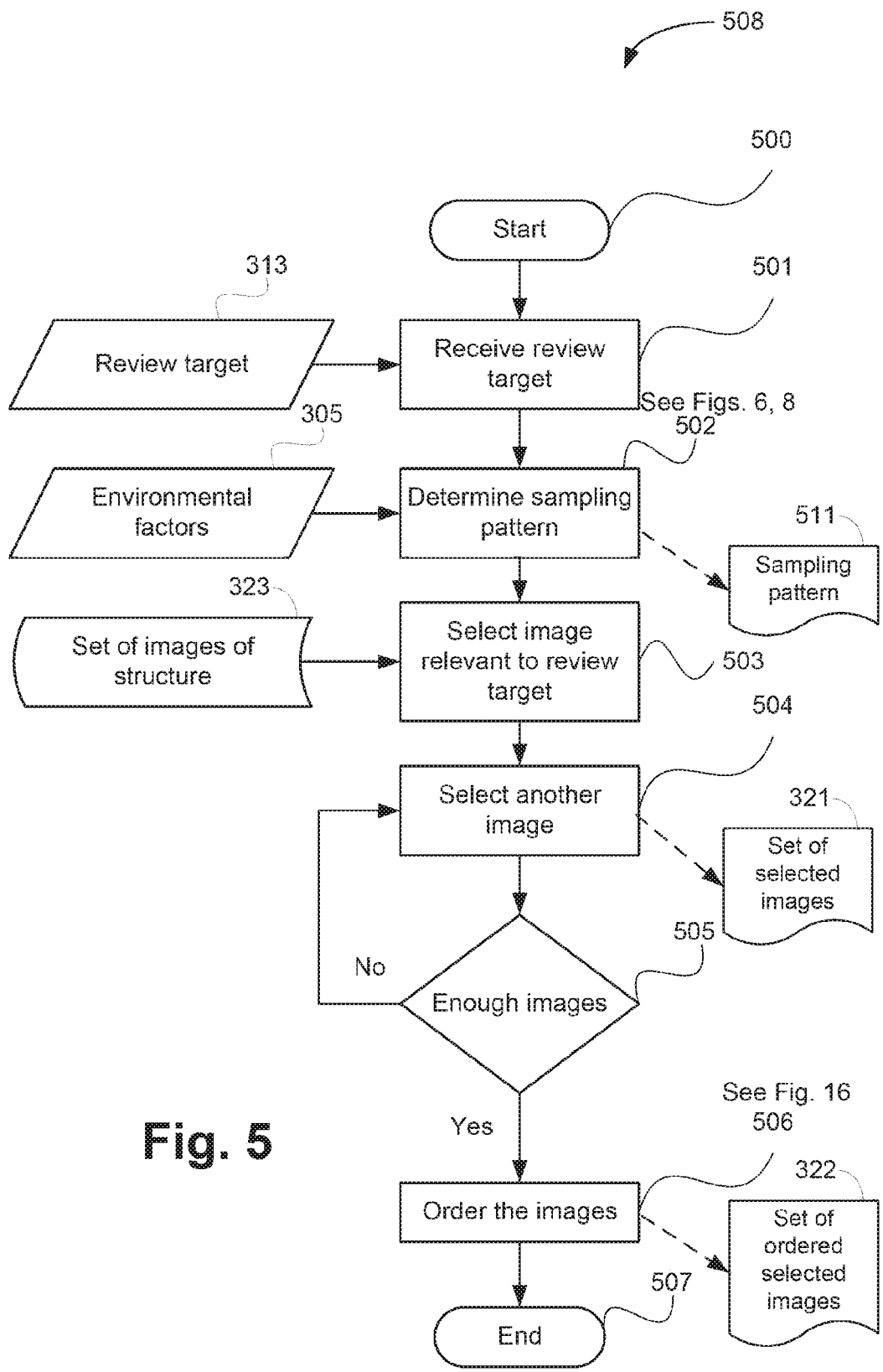
FIG. 5 is a schematic flow diagram illustrating one example of a method wherein a sequence of images is selected based on a review target given environmental factors.

FIG. 5 depicts a method 508 for selecting images for review by the user 311. The large number of images 323 of the structure 300 have been captured over time from different positions. The user 311 wishes to make an assessment of the structure 300 with regard to the review target 313. The method 508, which is performed by the processor 105 as directed by the software program 133, selects the subset 321 of images from the large number of captured images 323. These selected images 321 are selected to enable the user 311 to make the assessment in an accurate and efficient manner. There is a natural trade-off between accuracy and efficiency. The more images that are selected (ie 321), the more confident the user will generally be of their assessment, however this assessment will take a longer time and will require more effort to review than would a smaller number of selected images 321.

Fewer selected images 321 thus typically leads to a quicker review, but runs a risk of producing a less accurate assessment. The disclosed method considers the environmental factors 305 that may impact the review target 313 and uses these environmental factors 305 to select the set 321 of selected images, through sampling. The selecting of the set 321 of selected image may reduce the risk of inaccurate assessment by varying a sampling rate so that attention of a reviewer is focused on images with a higher probability of containing items of interest. Ordering of the selected images, by the step 317 which is performed by the processor 105 as directed by the software program 133, aids the user to review the images in a most efficient manner.

The method 508, which is performed by the system depicted in FIGS. 1A and 1B, starts with a step 500. Thereafter a step 501, which is performed by the processor 105 as directed by the software program 133, receives the review target 313 of the structure 300 in question. A following step 502, described hereinafter in more detail with reference to FIG. 6, and which is performed by the processor 105 as directed by the software program 133, receives the environmental factors 305 that may impact the structure 300, and determines a sampling pattern 511 based on the environmental factors 305. From the captured images 323 that are stored in the memory 109 one image that is relevant to the review target 313 is selected by a step 503, which is performed by the processor 105 as directed by the software program 133, based upon the sampling pattern 511.

A following step 504, which is performed by the processor 105 as directed by the software program 133, selects another image using the sampling pattern 511, thereby creating together with the image selected by the step 503 the (partial) set 321 of selected images. A following test step 505, which is performed by the processor 105 as directed by the software program 133, determines based upon the number of images in the set 321 of images if the number of images in the set 321 is a statistically meaningful number of images for the user to review. If this is not the case then the method 508 follows a NO arrow back to the step 504. If sufficient images have been selected and the set 321 of selected images is large enough, the method 508 follows a YES arrow to a step 506.

The step 506, which is performed by the processor 105 as directed by the software program 133, orders the set 321 of selected images to produce the set 322 of ordered selected images which improves the quality of the user's judgement of the review target 506. The method ends at a step 507, which is performed by the processor 105 as directed by the software program 133, the method 508 having produced the ordered image selection 322 for presentation to the user 311 for judgement of the review target.

FIG. 6 is a schematic flow diagram illustrating an example of a method 612 wherein a plurality of environmental factors are used to combine predetermined sampling patterns in order to generate a sampling pattern. This method is an example of a detailed implementation of the step 502 in FIG. 5.

The method 612 commences with a start step 601, performed by the processor 105 as directed by the software program 133, which receives the review target 313. A following step 602, performed by the processor 105 as directed by the software program 133, receives a set 603 of environmental factors that are relevant to the review target 313 (eg see Table 1). A first environmental factor 613 in the set 603 is read in a following step 604, performed by the processor 105 as directed by the software program 133. A following step 605, performed by the processor 105 as directed by the software program 133, selects a predetermined sampling pattern 614 from a set 606 of predetermined sampling patterns, the selected predetermined sampling pattern 614 being appropriate for the environmental factor being considered. Relationships between some predetermined sampling patterns and their associated environmental factors are illustrated in FIGS. 11-14.

A following decision step 607, performed by the processor 105 as directed by the software program 133, determines if the environmental factor 613 has geospatial variation (see FIG. 18 and associated description relating to environmental factors having geospatial variation). If this is the case, then the method 612 follows a YES arrow to a step 608, performed by the processor 105 as directed by the software program 133, which generates a geospatial variation dependent sampling pattern 615 from the predetermined sampling pattern 614, examples of which are described in more detail in regard to FIG. 18.

Figure 13:
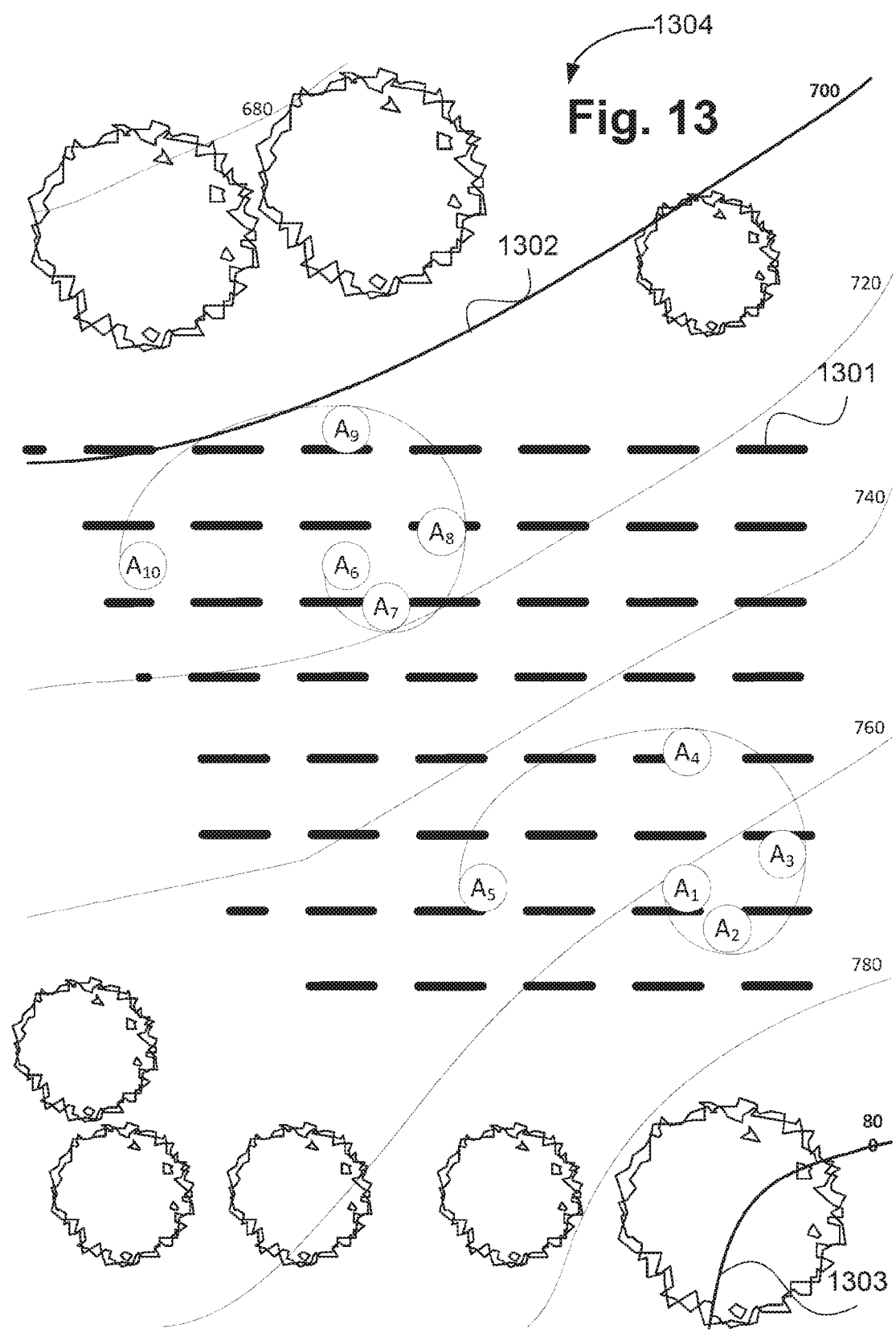
FIG. 13 illustrates topology and humidity environmental factors combining to influence sample locations for downy mildew in a trellised agricultural crop structure.

A following step 609, performed by the processor 105 as directed by the software program 133, combines the predetermined sampling pattern 614 (or the geospatial variation dependent sampling pattern 615 if the step 607 returns a logical "TRUE") with the previous predetermined sampling pattern (or the corresponding geospatial variation dependent sampling pattern) generated from earlier processing of environmental factors to form a combined sampling pattern 616 (see FIG. 13 and the associated description for an example of combining sampling patterns).

A following step 610, performed by the processor 105 as directed by the software program 133, determines if there are more environmental factors affecting the structure 300 from the set 603 to be processed, and if so the method 612 follows a YES arrow back to the step 605. If however the step 610 returns a logical "FALSE", ie when all the environmental factors 603 have been considered, then the method 612 follows a NO arrow to a termination step 611, performed by the processor 105 as directed by the software program 133. The combined sampling pattern 616 is the final sampling pattern 511 once the method 612 concludes.

Figure 7:
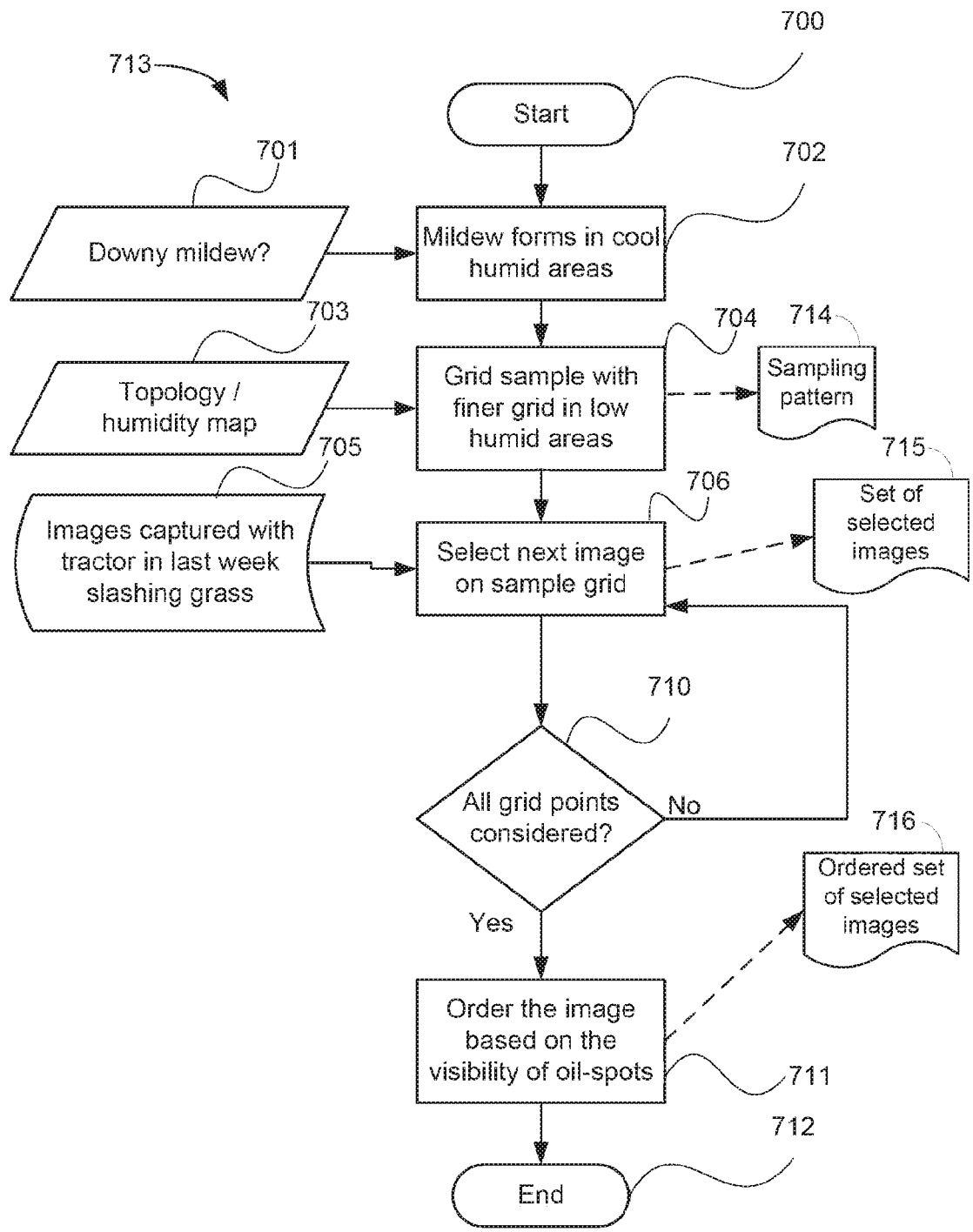
FIG. 7 is a schematic flow diagram illustrating an example wherein a sequence of images is selected based on a downy mildew review target given topology/humidity environmental factors.

FIG. 7 depicts a worked example 713 of the method 508 of FIG. 5 for a vineyard where the user wishes to know the current downy mildew load on the grapevines. Downy mildew is a fungus-like oomycete parasite of plants which can lead to significant negative impact on grape yield and quality in vineyards. Downy mildew occurs mostly in cool humid conditions and outbreaks can be triggered by rain. Infection presents itself as marks on the upper side of vine leaves which are yellow to brown compared to the normal green. On the underside the infection presents as a white cotton-like surface, which gives the disease its name.

The method 713 starts with a start step 700, performed by the processor 105 as directed by the software program 133. A following step 702, performed by the processor 105 as directed by the software program 133, receives a downy mildew review target request 701. Since downy mildew forms in cool humid areas, the environmental factors relevant to the sampling pattern include humidity (e.g. recent rain) and the topology of the vineyard, these environmental factors being described by a topology/humidity map 703. A following step 704, performed by the processor 105 as directed by the software program 133, generates from the topology/humidity map 703 a sampling pattern 714 that has a partially random grid with higher density/finer sampling in lower areas and those with more recent rainfall.

In the present example, the full set of images (not shown) that is available is very large as the vineyard has been continuously imaged for several years. However for the present assessment a subset 705 of the full image set associated with the vineyard is selected from the previous week. These are images captured by a vehicle mounted camera while slashing was being carried out in the vineyard. Slashing (grass-cutting, mowing) is carried out in the inter-row space between vines in order to reduce competition from weeds and grass and to ensure good air-flow through the vines. Air flow reduces humidity in the vine canopy which also helps reduce mildew.

Using the sampling pattern 714 generated by the step 704 an image is selected from the captured images 705 by a following step 706, performed by the processor 105 as directed by the software program 133. The selection step 706 picks an image from the subset 705 that is closest to a first, or next, sample point in the sampling pattern. A following test step 710, performed by the processor 105 as directed by the software program 133, determines if all grid points on the sampling pattern 714 have been considered. If this is not the case, then the method 713 follows a NO arrow back to the step 706. If on the other hand all grid points have been considered, then the method 713 follows a YES arrow to a step 711.

The step 711, which is performed by the processor 105 as directed by the software program 133, orders the set 715 of selected images to form an ordered set 716 of selected images for presentation to the user. This ordering typically enables the user to make a quick assessment of the review target, the images being ordered such that those with oil-spot features are presented first. The method 713 then terminates at a step 712.

Figure 8:
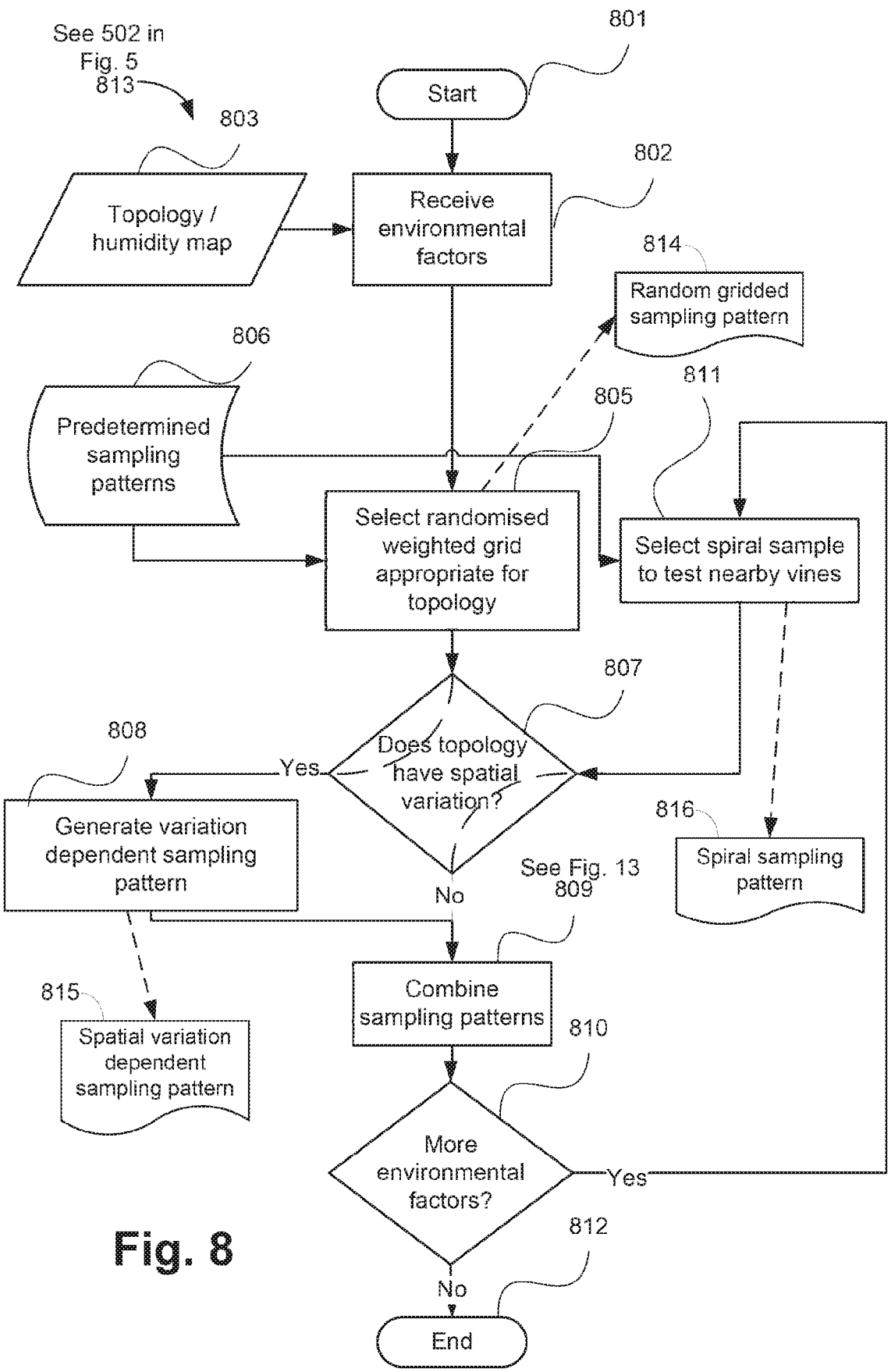
FIG. 8 is a schematic flow diagram illustrating an example wherein topology/humidity environmental factors are used to combine predetermined sampling patterns to generate a sampling pattern for downy mildew review target.

FIG. 8 is a schematic flow diagram illustrating an example 813 of the method of FIG. 6. This method is an example of a detailed implementation of the step 502 in FIG. 5. In this worked example a vineyard sampling pattern is generated for a review target of downy mildew. The relevant environmental factors are topology and micro-climate/humidity, ie two environmental factors. The topology impacts the humidity level and temperature where higher humidity and lower temperatures—which tend to occur at lower lying areas—increase the downy mildew risk. The micro-climate also impacts the way in which the infection spreads.

The method 813 commences at a step 801 after which a following step 802, which is performed by the processor 105 as directed by the software program 133, receives relevant environmental factors which in this case are provided in the form of a topology/humidity map 803 depicting topology of the vineyard as this impacts humidity. A following step 805, which is performed by the processor 105 as directed by the software program 133, selects a random gridded sampling pattern 814 from a set 806 of predetermined sampling patterns as being relevant for the topology environmental factor.

Examples of sampling patterns are shown in more detail in FIG. 18, with a random gridded sampling pattern shown at 1803.

The grid in the sampling pattern 814 helps ensure that sampling points are relative evenly spread. The random attribute of the sampling pattern 814 places sample points randomly in the grid square.

A following test step 807, which is performed by the processor 105 as directed by the software program 133, determines if the topology environmental factor exhibits spatial variation. If this is the case, the method 813 follows a YES arrow to a step 808. The step 808, which is performed by the processor 105 as directed by the software program 133, generates a variation dependent sampling pattern 815 from the sampling pattern 814. This variation dependence is applied to the random gridded sampling pattern 814 by changing density of sampling points dependent upon the height above sea-level. Higher sampling point density is applied at lower altitudes. The resultant sampling pattern 815 (or 814 if there is no spatial variation) would be combined by a following step 809, which is performed by the processor 105 as directed by the software program 133, with a sampling pattern from an earlier iteration. However, since for the initial iteration of the method 813 there is no previous sampling pattern this step 809 has no effect for the first iteration.

A following step 810, which is performed by the processor 105 as directed by the software program 133, determines if there are further environmental factors to consider. In the present example, there are two environmental factors, namely tolopogy and microclimate. Since only topology has been considered, the process 813 follows a YES arrow to a step 811. The step 811, which is performed by the processor 105 as directed by the software program 133, considers the other environmental factor being micro-climate. Downy mildew can occur in patches and an infection may be localised or widespread. Based upon the consideration of micro-climate the step 811 selects a spiral sampling pattern 816 from the set 806.

The following test step 807 determines that this environmental factor (ie microclimate) does not have spatial variation. Accordingly, the method 813 follows a NO arrow to the step 809, performed by the processor 105 as directed by the software program 133, which combines the spiral sampling pattern 816 and the gridded sampling pattern 814 (or alternately the spatial variation dependent sampling pattern 815) by means of convolution as explained above in relation to FIG. 4.

As described hereinafter in more detail with reference to FIG. 13, each point of the grid sampling pattern 814 or 815 is converted to a sampling spiral. The step 810 determines that there are no more environmental factors to consider, and so the method 813 ends with a termination step 812.

Figure 9:
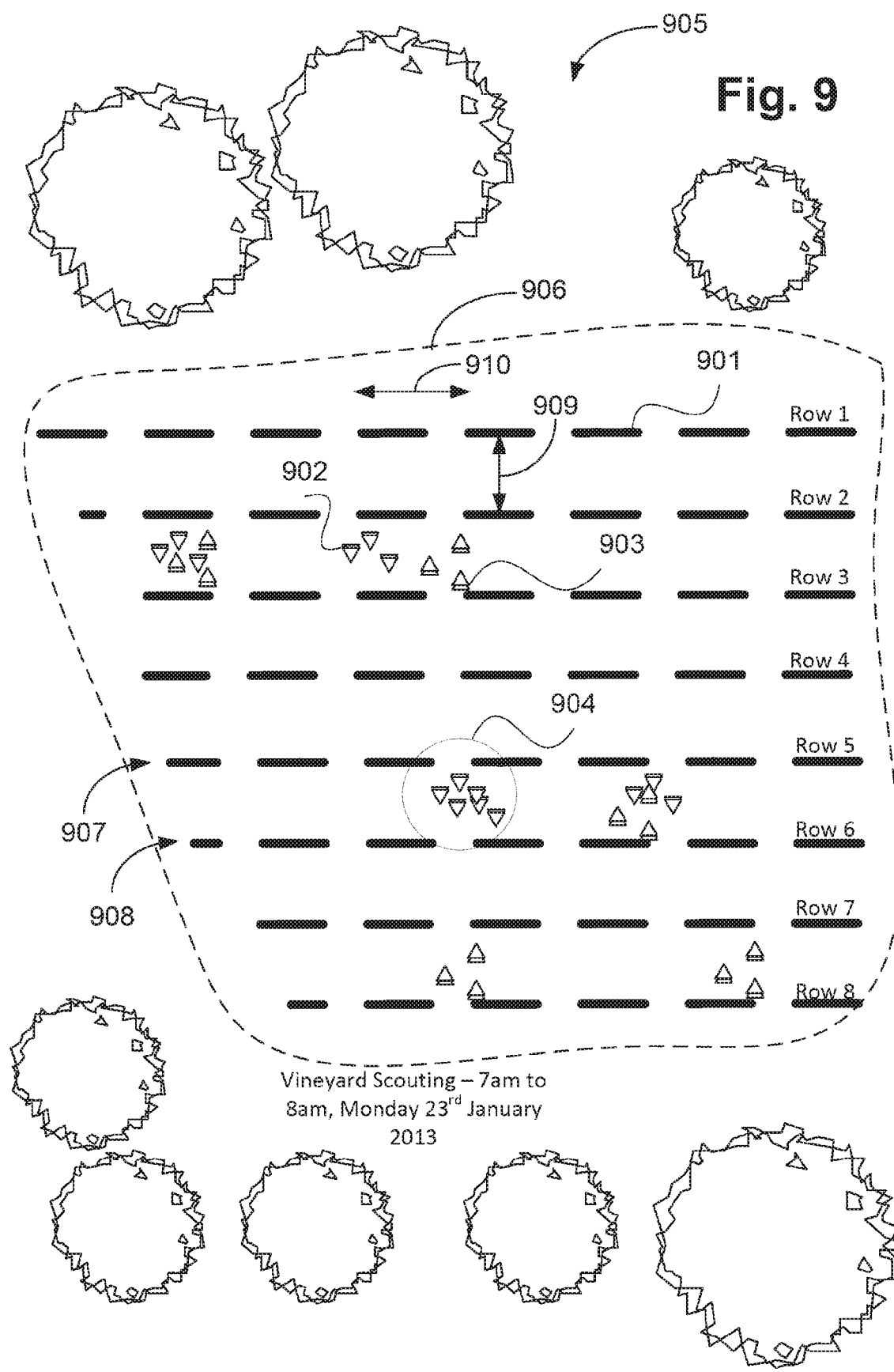
FIG. 9 illustrates manually captured images in a trellised agricultural crop structure.

FIG. 9 depicts manually captured images in a trellised agricultural crop structure 905. Such a structure includes a vineyard block 906. Vineyards are generally made up of multiple blocks of vines each arranged in rows such as 907, 908. Each row is equally spaced at around 3 metres for Australian vineyards (as depicted by an arrow 909), and subdivided into panels such as 901 which are spaced at around 6 metres between trellising posts, as depicted by an arrow 910. In each panel around 4-6 vines will be grown. Vineyards rows tend to be oriented North/South to allow a similar degree of sunlight to fall on both sides of the row. In other countries, climates and topology other arrangements are used. However the general common factor is that vines are planted in rows which are accessible by travelling down the space between rows, as it can be difficult to travel across a row due to wires, wines, irrigation lines etc.

When a viticulturist or other vineyard manager is undertaking scouting, that is travelling through the vineyard to make observations, he/she will tend to go up/down between only a few rows in a block. If he/she sees an issue or wishes to record some information they may capture images using a camera. These will tend to be in bursts at a given location between the rows (as depicted at 904), although these images may be captured of both rows. In FIG. 9 images are represented by triangles with a double side representing the direction the camera was pointing when the image in question was captured, and an apex of the triangle opposite the double side representing the location of the camera. One image with reference numeral 903 shown in the example is pointing at row 3, whereas another image designated by reference numeral 902 is pointing at row 2. All the images represented in FIG. 9 have been captured on 23 Jan. 2013 from 7-8 am AEST. Their locations were recorded using position data captured by the camera.

Figure 10:
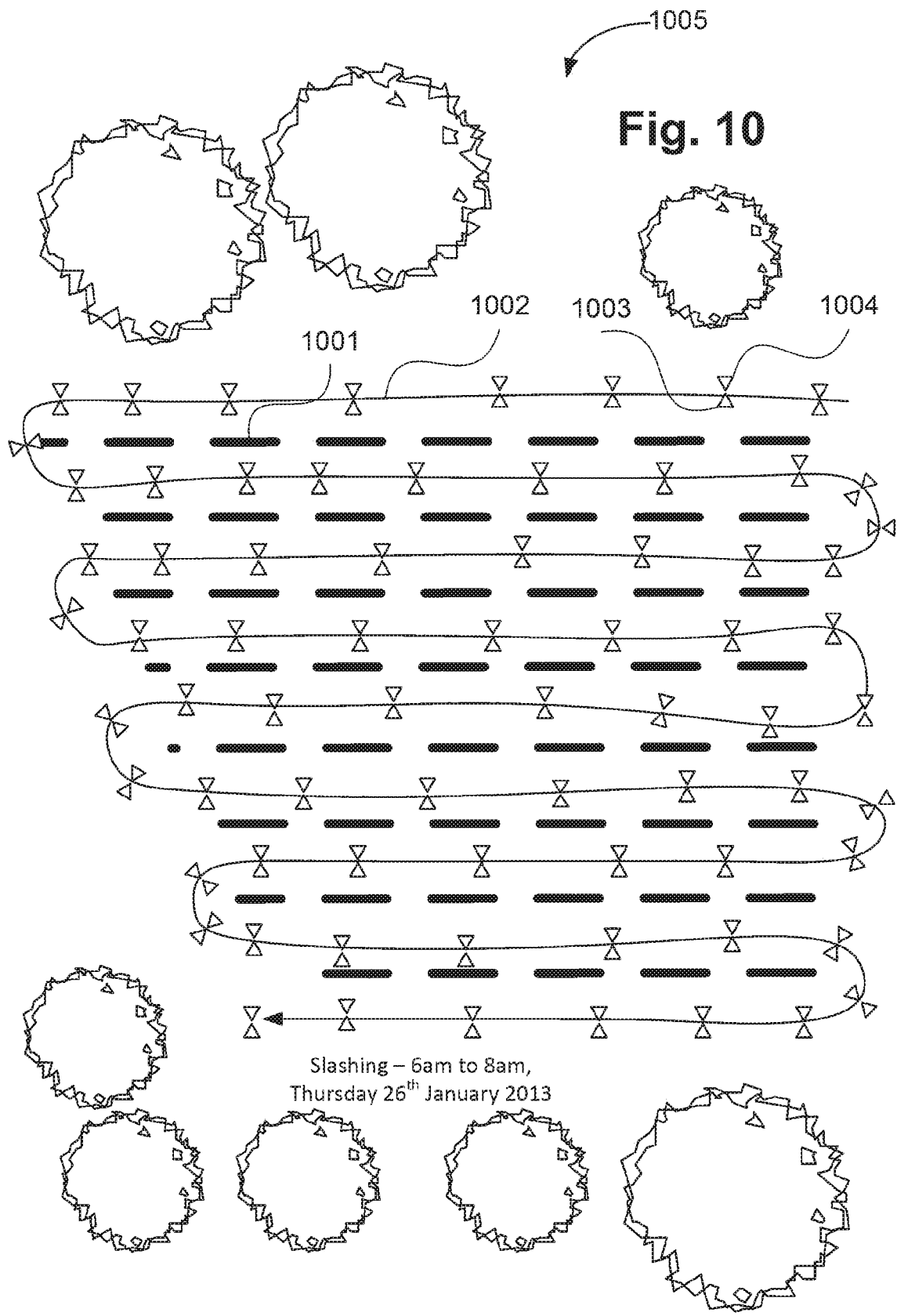
FIG. 10 illustrates images captured by a tractor passing down the rows of a trellised agricultural crop structure.

FIG. 10 illustrates images captured by a tractor passing down the rows of a trellised agricultural crop structure 1005. Such a structure includes a vineyard block as depicted in FIG. 9. A tractor in this example has travelled down inter-row gaps and along the top and bottom of the block. This might have occurred, for example, while slashing weeds/grass in the inter-row gap. The tractor's path 1002 is shown as a continuous line. The tractor carries a pair of cameras that are configured to capture images at regular intervals.

A pair of images 1003 and 1004 are captured by respective cameras pointing to either side of the tractor. The images are captured along the entire path of the tractor through the block.

Locations of the captured images are recorded as metadata together with the image along with time/date information. In this case the slashing was on 26 Jan. 2013 between 6 and 8 am AEST. The resulting image set would have recorded both sides of all the rows and panels of the vineyard block. With a sufficiently wide angle lens on the camera this would capture all the vines from each side. A tractor that carries out spraying might not travel down every row since spray rigs often cover two rows for each inter-row travelled. Additionally the route the tractor travels might not be alternative rows but another pattern to accommodate turning circle limitations.

Figure 11:
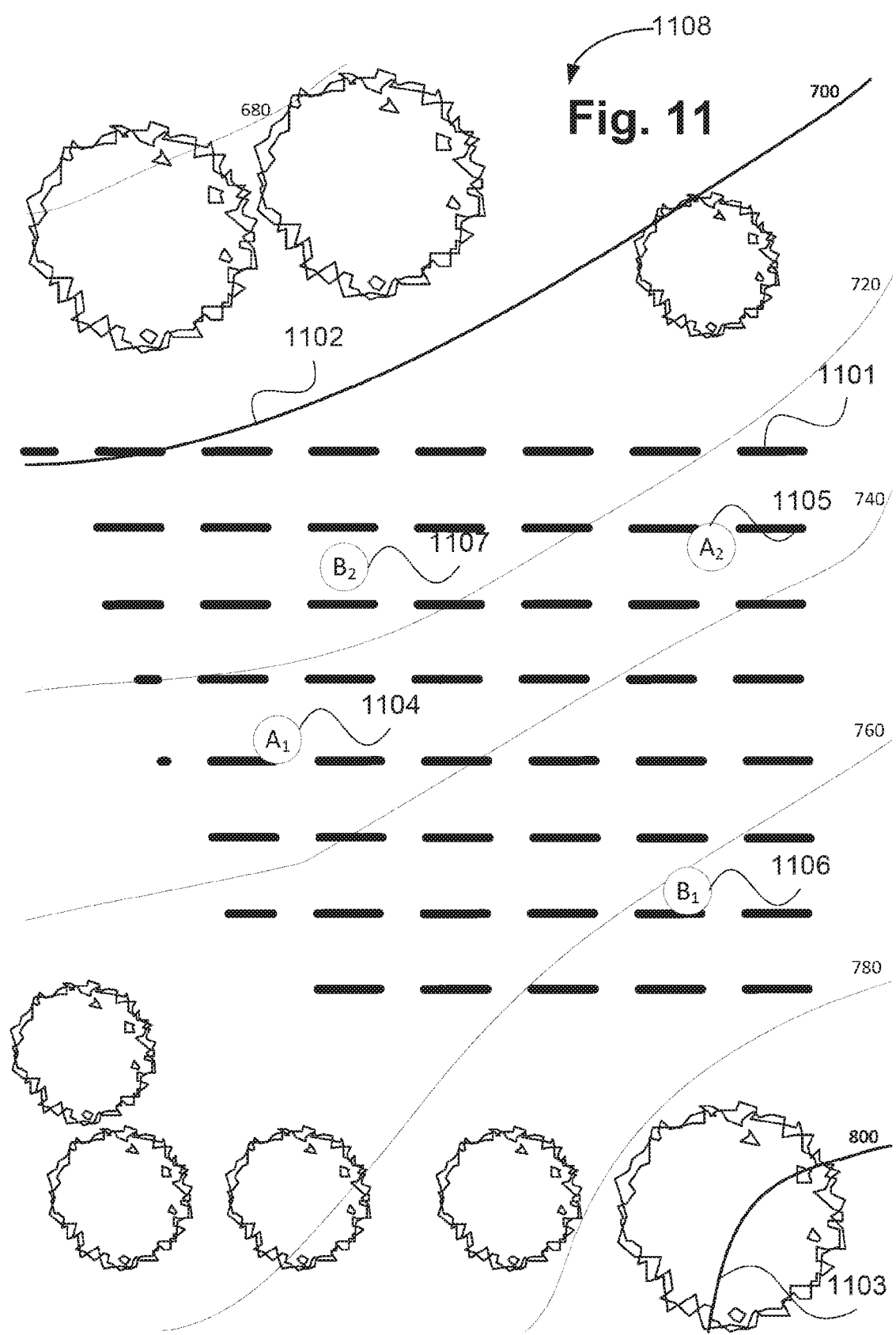
FIG. 11 illustrates topology as an environmental factor influencing sample locations in a trellised agricultural crop structure.

FIG. 11 illustrates how a topology environmental factor influences sample locations in a trellissed agricultural crop structure 1108. Such a structure includes a vineyard block made up of rows/panels 1101. In this illustration contours of height above sea level are marked as shown in an example contour line 1102 having a contour unit 700. The contour lines indicate that a slope runs downhill from bottom right of FIG. 11 to top left of FIG. 11 the slope commencing at over 800 units (depicted by a reference numeral 1103) to less than 680 units.

A sampling pattern used for selection of images for assessment has been applied which defines two locations for sampling. In the first case it has selected a location $A_1$ (having reference numeral 1104) and $A_2$ (having reference numeral 1105) as sampling locations. In a second case it has selected $B_1$ (having reference numeral 1106) and $B_2$ (having reference numeral 1107) locations. Although the number of sample points is the same in both cases the B set is potentially better as the two locations sample more variation in the altitude at approximately 760 and 710 units above sea level respectively. Whereas the A set are both at about 730 units.

Figure 12:
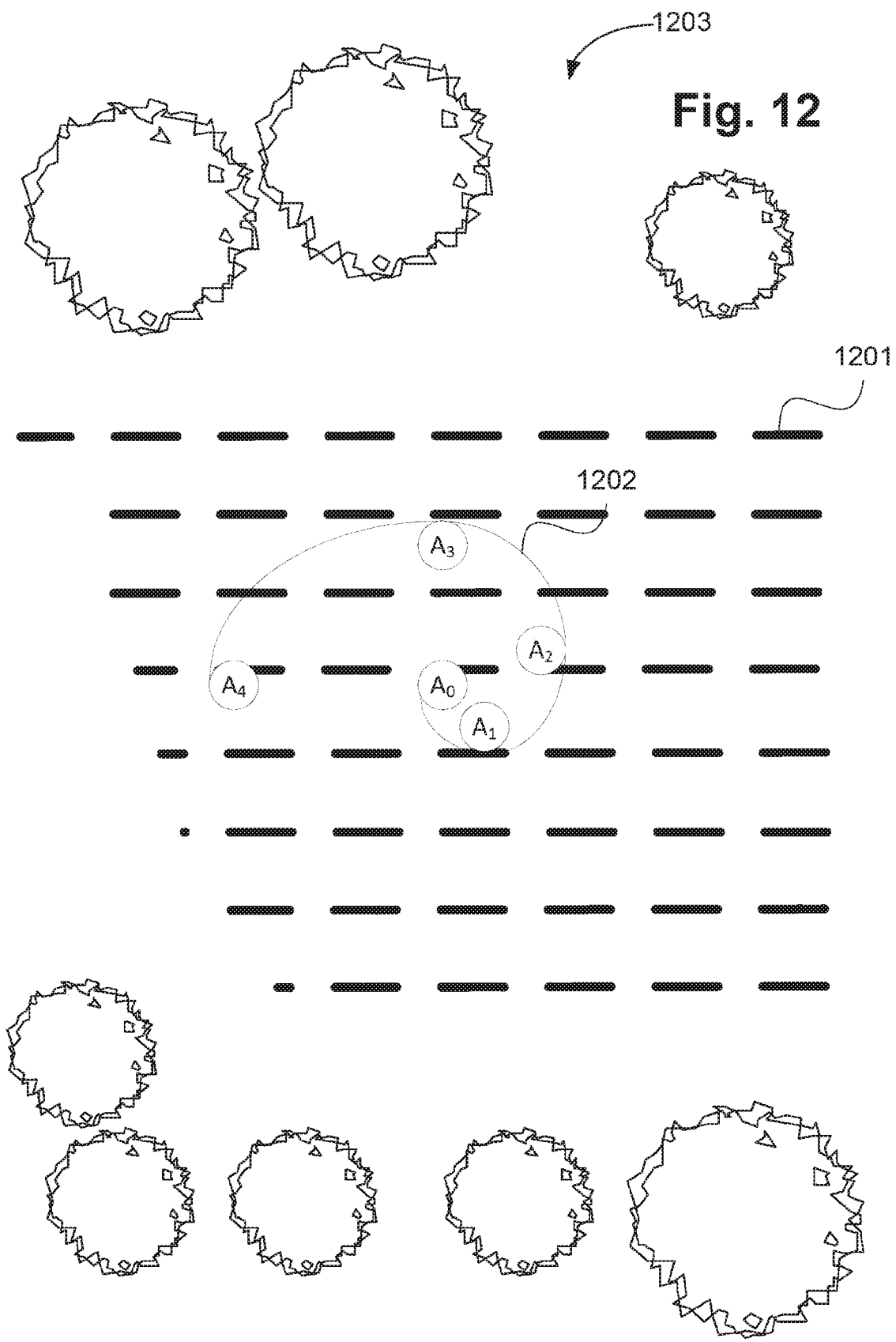
FIG. 12 illustrates a humidity environmental factor influencing sample locations for downy mildew in a trellised agricultural crop structure.

FIG. 12 illustrates how a humidity environmental factor influences the sample locations for downy mildew in a trellised agricultural crop structure 1203. Such a structure includes a vineyard block made up of rows/panels 1201. In this illustration sample points $A_0$, $A_1$, $A_2$, $A_3$ and $A_4$ are arranged on a spiral 1202. The location of $A_0$ has been chosen at random.

FIG. 13 illustrates how topology and humidity environmental factors combine to influence sample locations for downy mildew in a trellised agricultural crop structure 1304. Such a structure includes a vineyard block made up of rows/panels 1301. The topology defines a slope running downwards from bottom right of FIG. 13 to top left with major contours at 800 (see 1303) and 700 (see 1302) units. In a similar manner to FIG. 11 two topology locations have been selected which corresponded to $B_1$ (see 1106) and $B_2$ (see 1107). For each of these sampling points a five sample point spiral pattern has been convolved, in accordance with the method 400 of FIG. 4 as described above, given rise to ten (10) sample points marked from $A_1$ to $A_{10}$, where $A_1$ to $A_5$ arose from $B_1$ and $A_6$ to $A_{10}$ from $B_2$.

Figure 14:
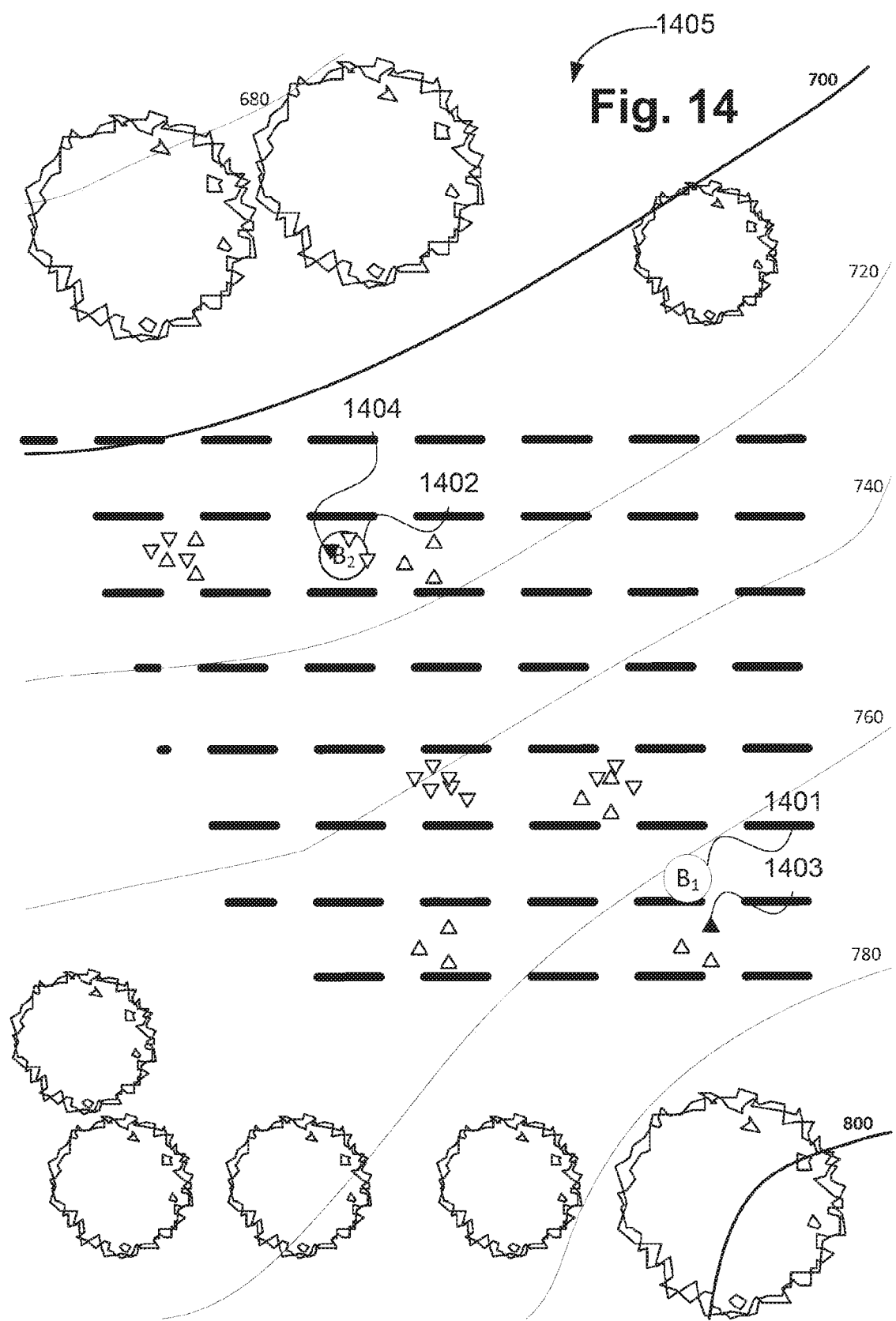
FIG. 14 illustrates image selection from sample locations in a trellised agricultural crop structure for a topology environmental factor.

FIG. 14 illustrates image selection from sample locations in a trellised agricultural crop structure 1405 for a topology environmental factor. Such a structure includes a vineyard block made up of rows/panels. FIG. 14 considers the manually captured images outlined in FIG. 9 represented by the triangles. With the sampling points $B_1$ (see 1401) and $B_2$ (see 1402) outlined in FIG. 11 defining the sampling locations for selection of images, the closest images to the sampling points B1 and B2 are selected, thus selecting two images 1403 and 1404. More particularly, the two images 1403 and 1404 are the images whose apexes (representing the respective camera positions) are closest to the respective centres of the circles representing the sampling points B1 and B2.

Figure 15:
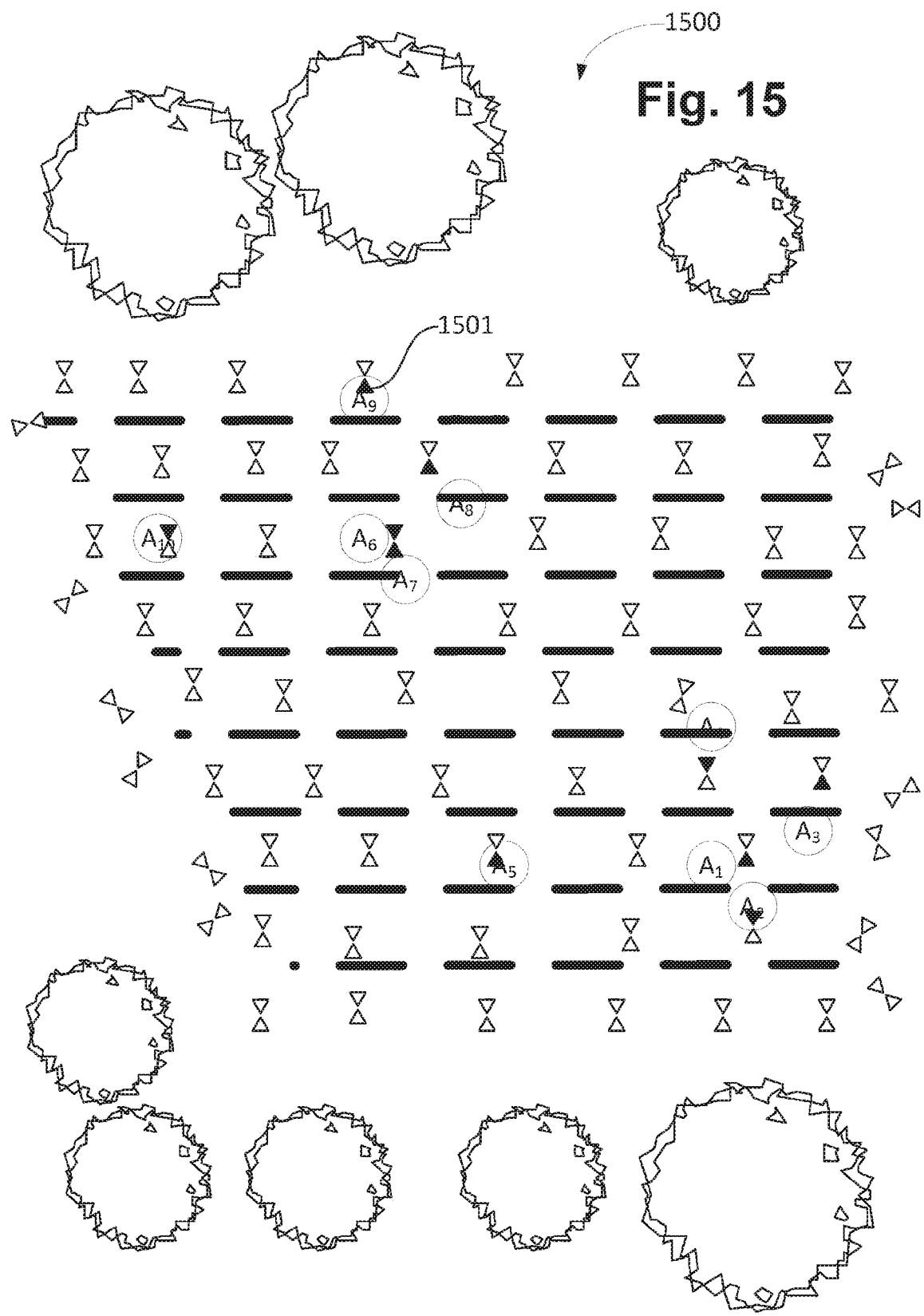
FIG. 15 illustrates image selection from sample locations in a trellised agricultural crop structure for topology and humidity environmental factors with downy mildew target review target.

FIG. 15 illustrates image selection from sample locations in a trellised agricultural crop structure 1500 for topology and humidity environmental factors with a downy mildew target review target. Such a structure includes a vineyard block made up of rows/panels. The manually captured images outlined in FIG. 9 are considered, and in FIG. 15 are represented by the triangles. With the sampling points $A_1$ to $A_{10}$ illustrated in FIG. 13 ten images (such as 1501) are selected which have been shown as solid triangles. These images have been selected on the basis that they are closest to the sampling points $A_1$ to $A_{10}$. This would result in ten images such as 1501 being passed to the user for assessment.

Figure 16:
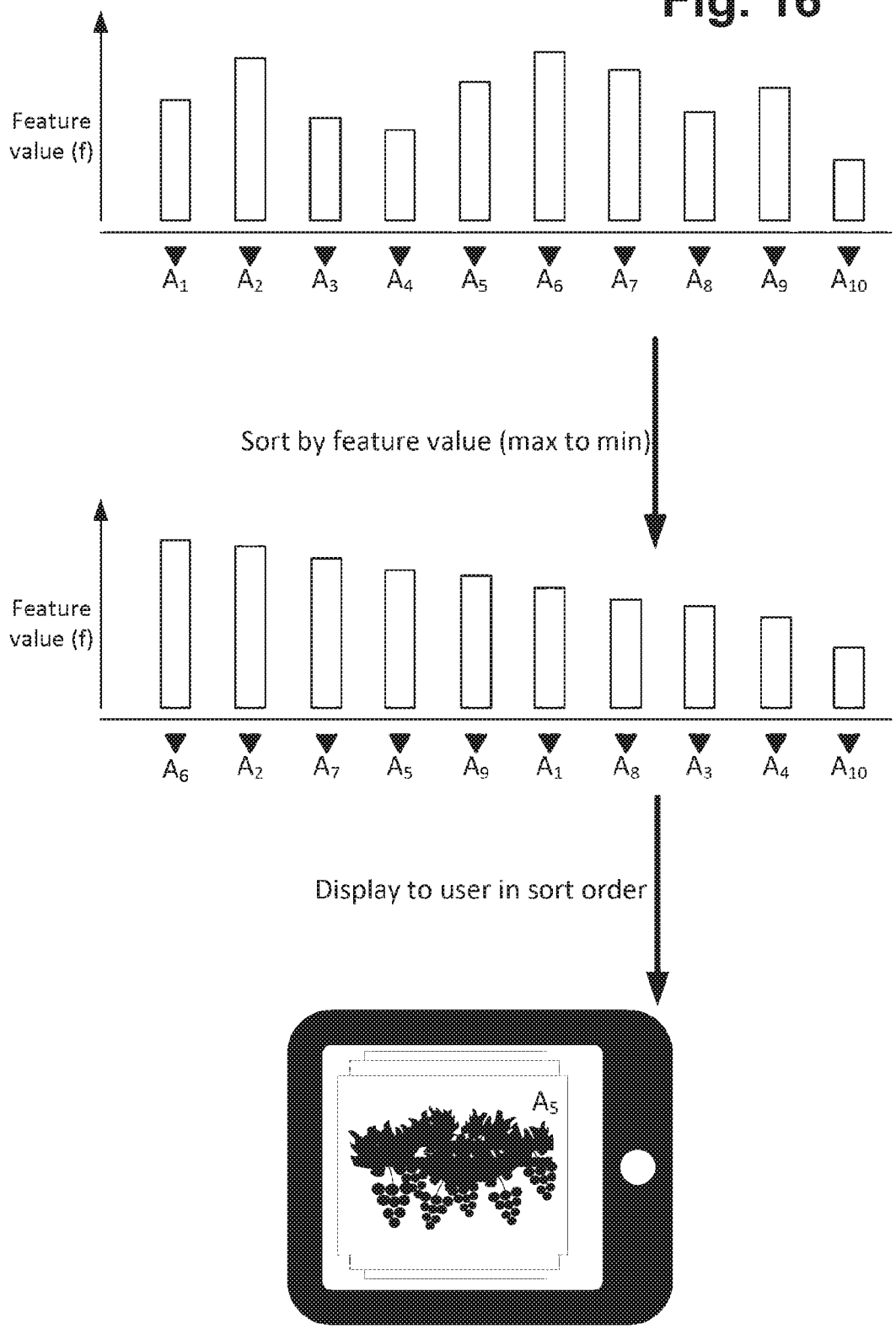
FIG. 16 illustrates ordering of selected images from sampling for presentation to a user.

FIG. 16 illustrates the ordering of selected images from sampling, such at is performed by the step 506 in FIG. 5, for presentation to a user, as depicted by the arrow 324 in FIG. 3. In this case the 10 images selected regard to FIG. 15 are considered. An image processing algorithm, performed by the processor 105 directed by the software program 133, runs on these images to determine an image feature for each image, such as the degree of downy mildew oil-spots visible. The image feature has a value for all ten images and in one example the simple ordering of highest to lowest is performed. The user is then presented these images in this order on their tablet assessment device as depicted by the arrow 324 in FIG. 3. The ordering in this case will enable the user to review the first few for severity of the downy mildew and then to skip to the least affected images. This can save time in making the assessment.

Figure 17:
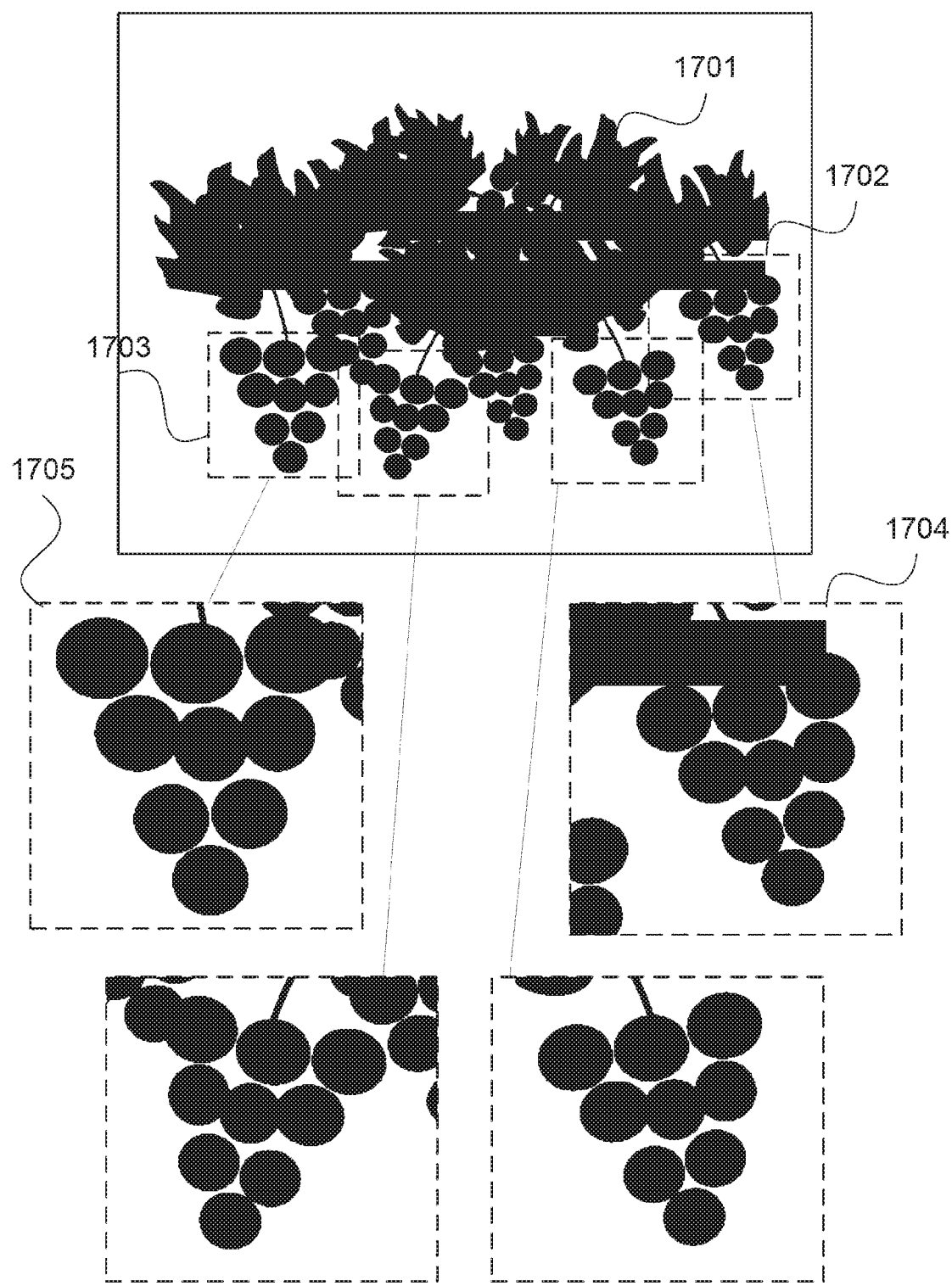
FIG. 17 illustrates a grape bunch detection algorithm segmenting a single image into four extra resultant images.

FIG. 17 illustrates a grape bunch detection algorithm segmenting a single image into four extra resultant images. The segmentation may be achieved using an image processing algorithm that has been built to recognise grape bunches. Alternatively a machine-learning apparatus may have been trained to recognise bunches. The algorithm runs on the images of the vine 1701 and detects bunches 1702, 1703. The bunches are then cropped into separate sub-images 1704, 1705. These sub-images can then be treated as individual images in the set 323 of images in FIG. 5 from a sampling perspective. Such an application is useful when reviewing a later stage assessment such as *Botrytis*, bunch-rot, or noble rot, which first appears late in the growing season close to harvest time.

FIGS. 18A-18D illustrates four predetermined sampling patterns and their application to a spatially varying environmental factor. Four predetermined sampling patterns are presented by images 1801, 1803, 1805, 1807 which respectively represent a random density sampling pattern, a random grid sampling pattern, a centred Gaussian and a centred spiral. These are shown of the left hand side of the respective figures.

Figure 18A:
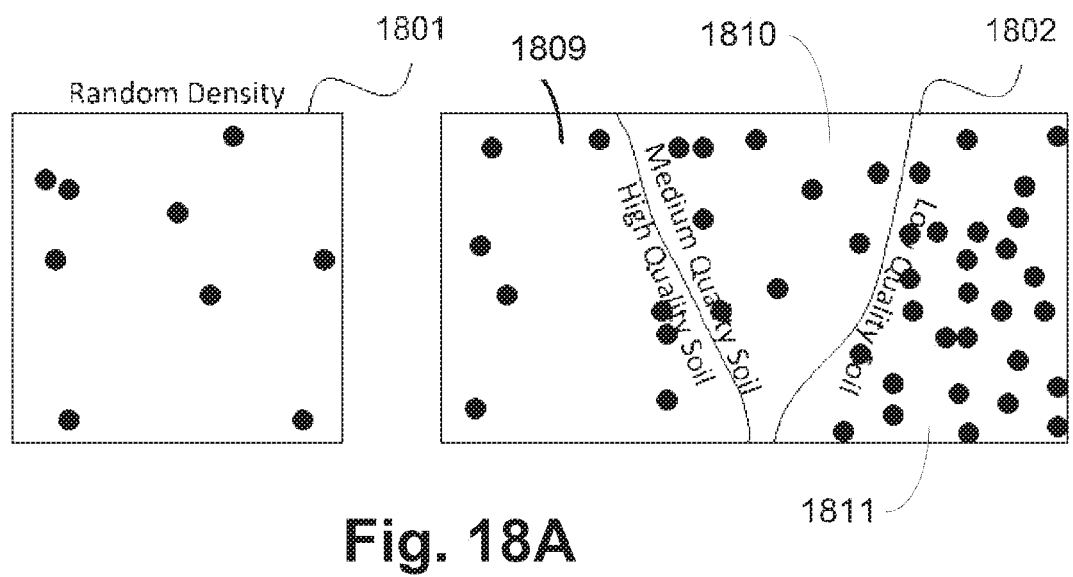
FIGS. 18A-D illustrates four predetermined sampling patterns and their application to a spatially varying environmental factor.

In FIG. 18A the random density sampling pattern 1801 considers a region in which a number of sampling points have been chosen at random. The density is determined by the area of the region and the number of points. If more points are located in the same area, a higher density results. The same number of points in a larger region results in a lower density.

On the right hand side of FIG. 18A an image 1802 depicts a worked example for an agriculture structure, such as a field with a varying environmental factor of soil quality. A left hand side 1809 of the structure 1802 has high quality soil, a middle section 1810 has medium quality soil, and a section 1811 on the right has low quality soil. The sampling pattern density is varied for these different soil types so that the high-quality soil 1809 has fewer sampling point—i.e. at a lower density—for a given area than the medium quality 1810 and low quality 1811 soils. The highest density sampling is used in the lowest quality area. Such a sampling might be appropriate where the crop planted in the field might be subject to nutrient deficiencies that are more likely to appear in the low-quality soil. More samples in the low quality area increase the chance of spotting the deficiency early.

Figure 18B:
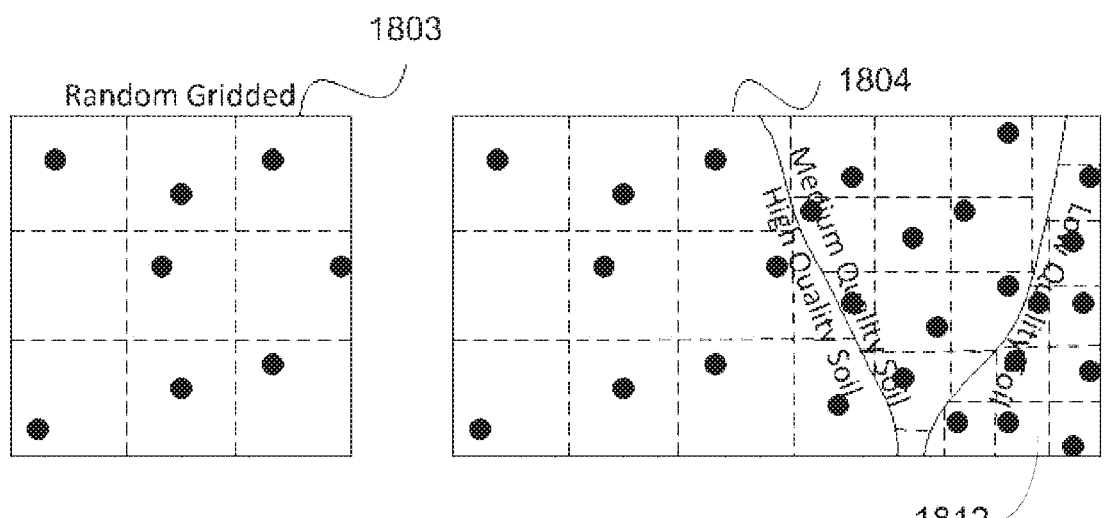

Turning to FIG. 18B the images 1803 and 1804 depict a random gridded sampling pattern. In this case the same density of sample points has been chosen as the random density as depicted in FIG. 18A. However, a grid is incorporated which constrains the randomness within each square on the grid. This helps to generate a more evenly spread sampling pattern. The randomness helps to reduce the chance of sampling points being in a straight line. This can cause systematic sampling bias, for example if the regular grid were to sample from a single row of a trellised structure over other rows. The right hand image 1804 of FIG. 18B depicts a worked example for the grid applied to an agricultural structure, such as a field, with a varying soil quality. In this case the fineness of the grid is varied depending upon the soil quality, with the finest grid 1812 being located in the region of poorer soil quality.

Figure 18C:
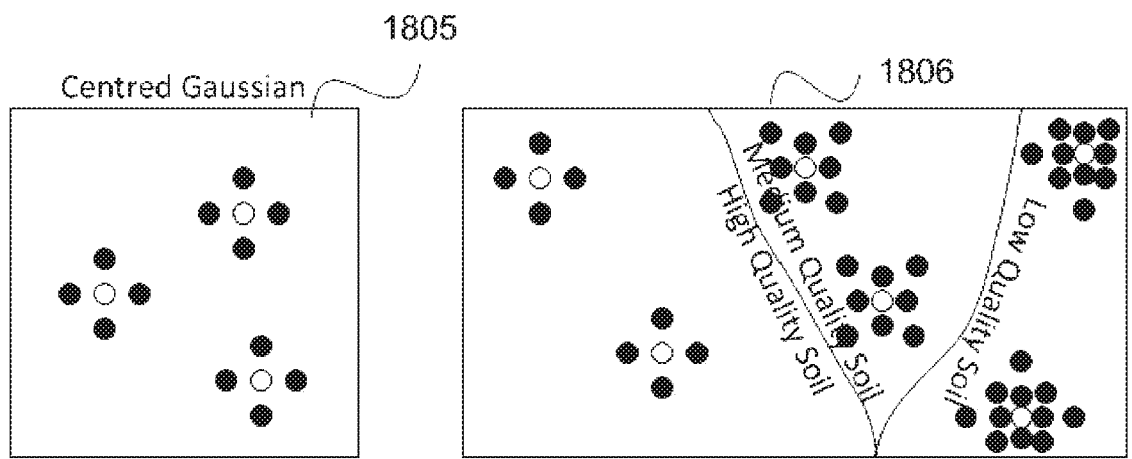

Turning to FIG. 18C the images 1805, 1806 depict a centred Gaussian sampling pattern. This pattern uses a sampling pattern that is centred on a point (marked grey) around which circularly symmetric points are defined. The number of points can be set as can the size of the distribution. The right hand image 1806 depicts the sampling pattern being applied to an agricultural structure, such as a field, with a varying soil quality. The smaller number of sampling points is used in the high-soil quality area with more sample points in the lower areas.

Figure 18D:
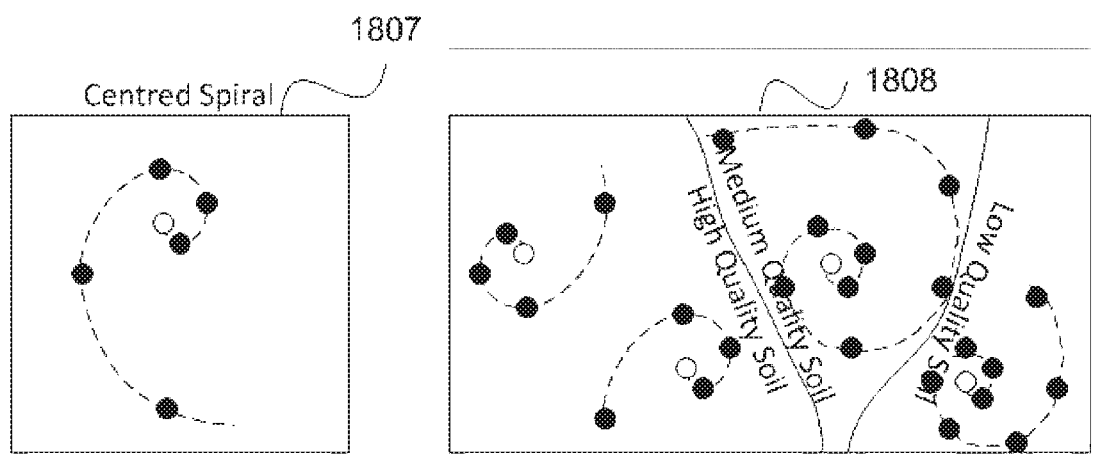

Turning to FIG. 18D the images 1807 and 1808 depict a centred spiral sampling pattern. This sampling pattern defines the sampling locations as a spiral centered on one point (marked grey). The number of points on the spiral and the divergence of the spiral may vary depending on the environmental factor being considered.

INDUSTRIAL APPLICABILITY

The arrangements described are applicable to the computer and data processing industries and particularly for the quality control and monitoring industries as applied to the fields of agriculture, construction and so on.

The foregoing describes only some embodiments of the present invention, and modifications and/or changes can be made thereto without departing from the scope and spirit of the invention, the embodiments being illustrative and not restrictive.

The invention claimed is:

1. A method for displaying a sequence of review images selected from a plurality of captured images related to agricultural crops or a field where the agricultural crops are cultivated, said method comprising:
   receiving a request from a user of a review target for specifying a growth condition of the agricultural crops or a condition of the fields and an environmental factor affecting the agricultural crops or the field;
   selecting, from the plurality of captured images, the review images based on the review target, the environmental factor and position information that indicates a position where each of the captured images is captured; and
   causing a display device to display the selected review images ordered according to the review target to form the sequence of review images,
   wherein the review images are selected in accordance with a sampling pattern, and wherein the sampling pattern is selected from a set of sampling patterns each including a location in the field at which one of the captured images has been captured, wherein the sampling pattern is selected from the set of sampling patterns depending upon the environmental factor.

2. The method according to claim 1, wherein the plurality of review images are selected based on a variation of values of the environmental factor within the agricultural crops or the field.

3. The method according to claim 2, wherein the selected plurality of review images are ordered according to a value of image features in each of the plurality of review images.

4. The method according to claim 1, wherein selecting the review images further comprises:
   selecting a first review image of at least a part of the agricultural crops or the field from the plurality of captured images related to the agricultural crops or the field, the first review image having associated position information with respect to the agricultural crops or the field and being selected based on the review target; and
   determining the review images from the plurality of captured images related to the agricultural crops or the field based on the position information of the selected first review image and the environmental factor.

5. The method according to claim 4, wherein the review images are determined in accordance with the sampling pattern.

6. The method according to claim 1, wherein the review target is selected by a user using a displayed user interface, the review target being at least one of: yield estimation, growth stage and disease wherein the review images are determined in accordance with a sampling pattern.

7. The method according to claim 1, comprising the further steps of:
   determining if the environmental factor has geospatial variation over the agricultural crops or the field; and
   if the environmental factor has geospatial variation over the agricultural crops or the field, generating a geospatial variation dependent sampling pattern,
   wherein the review images are selected in accordance with the geospatial variation dependent sampling pattern.

8. The method according to claim 1, comprising the further steps of:
   determining if the environmental factor has geospatial variation over the agricultural crops or the field; and
   if the environmental factor has geospatial variation over the structure, generating a geospatial variation dependent sampling pattern; and
   determining if there is a further environmental factor, from a set of environmental factors, affecting the agricultural crops or the field; and
   if there is a further environmental factor, selecting a predetermined sampling pattern from a set of predetermined sampling patterns depending upon said further environmental factor associated with the agricultural crops or the field,
   wherein the review images are selected in accordance with the geospatial variation dependent sampling pattern and the predetermined sampling pattern.

9. The method according to claim 1, comprising the further steps of:
   determining if the environmental factor has geospatial variation over the agricultural crops or the field; and
   if the environmental factor has geospatial variation over the structure, generating a geospatial variation dependent sampling pattern;
   determining if there is a further environmental factor, from a set of environmental factors, affecting the agricultural crops or the field; and
   if there is a further environmental factor, selecting a predetermined sampling pattern from a set of predetermined sampling patterns depending upon said further environmental factor associated with the agricultural crops or the field; and
   combining the predetermined sampling pattern and the geospatial variation dependent sampling pattern to form a combined sampling pattern,
   wherein the review images are selected in accordance with the combined sampling pattern.

10. The method according to claim 1, comprising the further steps of:
    determining if the environmental factor has geospatial variation over the structure; and
    if the environmental factor has geospatial variation over the structure, generating a geospatial variation dependent sampling pattern;
    determining if there is a further environmental factor, from a set of environmental factors, affecting the structure; and if there is a further environmental factor, selecting a predetermined sampling pattern from a set of predetermined sampling patterns depending upon said further environmental factor associated with the structure; and combining the predetermined sampling pattern and the geospatial variation dependent sampling pattern to form a combined sampling pattern, wherein the combining step comprises convolving the predetermined sampling pattern and the geospatial variation dependent sampling pattern to form the combined sampling pattern, wherein the review images are selected in accordance with the combined sampling pattern.

11. An apparatus for displaying a sequence of review images selected from a plurality of captured images related to agricultural crops or a field where the agricultural crops are cultivated, the apparatus comprising:

a processor; and a memory device storing a computer executable program for directing the processor to perform a method for displaying a sequence of review images, said method comprising:

receiving a request from a user of a review target for specifying a growth condition of the agricultural crops or a condition of the fields and an environmental factor affecting the agricultural crops or the field;

selecting, from the plurality of captured images the review images based on the review target, the environmental factor and position information that indicates a position where each of the captured images is captured; and causing a display device to display the selected review images ordered according to the review target to form the sequence of review images, wherein the review images are selected in accordance with a sampling pattern, and wherein the sampling pattern is selected from a set of sampling patterns each including a location in the field at which one of the captured images has been captured, wherein the sampling pattern is selected from the set of sampling patterns depending upon the environmental factor.

12. A non-transitory computer readable medium storing a computer executable program for directing a processor to perform a method for displaying a sequence of review images selected from a plurality of captured images related to agricultural crops or a field where the agricultural crops are cultivated, said method comprising:

receiving a request from a user of a review target for specifying a growth condition of the agricultural crops or a condition of the fields and an environmental factor affecting the agricultural crops or the field;

selecting, from the plurality of captured images, the review images based on the review target, the environmental factor and position information that indicates a position where each of the captured images is captured; and causing a display device to display the selected review images ordered according to the review target to form the sequence of review images, wherein the review images are selected in accordance with a sampling pattern, and wherein the sampling pattern is selected from a set of sampling patterns each including a location in the field at which one of the captured images has been captured, wherein the sampling pattern is selected from the set of sampling patterns depending upon the environmental factor.

\* \* \* \* \*